US012454121B2

(12) United States Patent
Wang et al.

(10) Patent No.: US 12,454,121 B2
(45) Date of Patent: Oct. 28, 2025

(54) PREPREGS, CORES AND ARTICLES INCLUDING EXPANDABLE GRAPHITE MATERIALS

(71) Applicant: HANWHA AZDEL, INC., Forest, VA (US)

(72) Inventors: Ruomiao Wang, Forest, VA (US); Yu-Tsan Tseng, Kennesaw, GA (US); Mark O. Mason, Covington, VA (US); Troy D. Robertz, Lake Orion, MI (US); Erich J. Vorenkamp, Pinckney, MI (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 14/939,125

(22) Filed: Nov. 12, 2015

(65) Prior Publication Data

US 2016/0168350 A1    Jun. 16, 2016

Related U.S. Application Data

(60) Provisional application No. 62/079,288, filed on Nov. 13, 2014.

(51) Int. Cl.
| | |
|---|---|
| *C08J 9/228* | (2006.01) |
| *B29C 44/34* | (2006.01) |
| *B29C 70/02* | (2006.01) |
| *B32B 5/02* | (2006.01) |
| *B32B 5/22* | (2006.01) |
| *B32B 5/24* | (2006.01) |
| *B32B 5/26* | (2006.01) |
| *B32B 5/32* | (2006.01) |
| *B32B 27/06* | (2006.01) |

(Continued)

(52) U.S. Cl.
CPC .......... *B32B 27/12* (2013.01); *B29C 44/3415* (2013.01); *B29C 70/025* (2013.01); *B32B 5/02* (2013.01); *B32B 5/22* (2013.01); *B32B 5/245* (2013.01); *B32B 5/26* (2013.01); *B32B 5/32* (2013.01); *B32B 27/065* (2013.01); *B32B 27/08* (2013.01); *B32B 27/18* (2013.01); *B32B 27/281* (2013.01); *B32B 27/283* (2013.01); *B32B 27/285* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *C08J 5/10* (2013.01); *C08J 5/244* (2021.05); *C08J 5/249* (2021.05); *C08J 9/228* (2013.01); *B29K 2105/048* (2013.01); *B29K 2507/04* (2013.01); *B32B 5/18* (2013.01); *B32B 2260/021* (2013.01); *B32B 2260/046* (2013.01); *B32B 2262/02* (2013.01); *B32B 2262/0269* (2013.01); *B32B 2262/10* (2013.01); *B32B 2262/101* (2013.01); *B32B 2262/103* (2013.01); *B32B 2262/106* (2013.01); *B32B 2262/108* (2013.01); *B32B 2264/08* (2013.01); *B32B 2266/0214* (2013.01); *B32B 2266/06* (2013.01); *B32B 2270/00* (2013.01); *B32B 2307/3065* (2013.01); *B32B 2605/00* (2013.01)

(58) Field of Classification Search
CPC ......... B05D 1/40; B32B 27/065; B32B 27/08; B32B 27/12; B32B 27/18; B32B 27/281; B32B 27/283; B32B 27/285; B32B 27/286; B32B 27/288; B32B 27/302; B32B 27/304; B32B 27/308; B32B 27/32; B32B 27/34; B32B 27/36; B32B 27/365; B32B 2260/021; B32B 2260/046; B32B 2262/02; B32B 2262/0269; B32B 2262/10; B32B 2262/101; B32B 2262/103; B32B 2262/106; B32B 2262/108; B32B 2264/08; B32B 2266/0214; B32B 5/32; B32B 5/26; B32B 5/245; B32B 5/02; B32B 5/22; B32B 2266/06; B32B 2270/00; B32B 5/18; B32B 2307/3065; B32B 2605/00; B32B 27/24; C08J 5/043; C08J 9/0066; C08J 9/228; C08J 5/10; C08J 5/24; C08K 3/04; B29C 70/00; B29C 70/025; B29C 44/3415; B29K 2105/048; B29K 2507/04
See application file for complete search history.

(56) References Cited

U.S. PATENT DOCUMENTS

| 4,643,940 A | 2/1987 | Shaw |
| 4,692,375 A | 9/1987 | Neubauer |

(Continued)

FOREIGN PATENT DOCUMENTS

| DE | 19718876 | 11/1998 |
| EP | 0408098 | * 3/1991 |

(Continued)

OTHER PUBLICATIONS

Expandable Flake Graphite | Asbury Carbons, 2013.*
IPRP for PCT/US14/55067 mailed on Mar. 11, 2016.
IPRP for PCT/US15/60289 mailed on Apr. 11, 2016.
IPRP for PCT/US16/31585 mailed on Aug. 25, 2016.
IPRP for PCT/US2015/557737 mailed on Mar. 4, 2016.
Extended European Search Report for EP15858964.8 dated May 23, 2018.

*Primary Examiner* — John M Cooney
(74) *Attorney, Agent, or Firm* — Rhodes IP PLC; Christopher R Rhodes

(57) ABSTRACT

Prepregs, composites and articles comprising expandable graphite materials dispersed in a thermoplastic layer are described. In some instances, a thermoplastic composite article comprises a porous core layer comprising a plurality of reinforcing fibers and a thermoplastic material, and the porous core layer further comprises expandable graphite particles homogeneously dispersed in the porous core layer.

17 Claims, 13 Drawing Sheets

(51) Int. Cl.
*B32B 27/08* (2006.01)
*B32B 27/12* (2006.01)
*B32B 27/18* (2006.01)
*B32B 27/28* (2006.01)
*B32B 27/30* (2006.01)
*B32B 27/32* (2006.01)
*B32B 27/34* (2006.01)
*B32B 27/36* (2006.01)
*C08J 5/10* (2006.01)
*C08J 5/24* (2006.01)
*C08J 9/00* (2006.01)
*B29K 105/04* (2006.01)
*B29K 507/04* (2006.01)
*B32B 5/18* (2006.01)

(56) References Cited

U.S. PATENT DOCUMENTS

| | | |
|---|---|---|
| 4,767,321 A | 8/1988 | Chilva |
| 4,793,802 A | 12/1988 | Chilva |
| 4,802,843 A | 2/1989 | Chilva |
| 4,950,532 A | 8/1990 | Das |
| 5,110,413 A | 5/1992 | Steer |
| 5,348,798 A | 9/1994 | Berghuis |
| 5,384,188 A | 1/1995 | Lebold |
| 5,389,716 A | 2/1995 | Graves |
| 5,643,989 A | 7/1997 | Van De Grampel |
| 5,648,027 A | 7/1997 | Tajiri |
| 5,952,248 A * | 9/1999 | Horton ............... B32B 5/02 427/209 |
| 6,083,602 A | 7/2000 | Caldwell |
| 6,274,647 B1 | 8/2001 | Knight |
| 6,286,879 B1 | 9/2001 | Haque |
| 6,329,468 B1 | 12/2001 | Wang |
| 7,157,034 B2 | 1/2007 | Bristow |
| 7,244,501 B2 | 7/2007 | Raghavendran |
| 7,255,391 B2 | 8/2007 | Bristow |
| 7,318,498 B2 | 1/2008 | Woodman |
| 7,431,980 B2 | 10/2008 | Woodman |
| 7,482,048 B2 | 1/2009 | Boutghrit |
| 7,682,697 B2 | 3/2010 | Raghavendran |
| 7,759,267 B2 | 7/2010 | Conover |
| 7,878,301 B2 | 2/2011 | Gross |
| 7,972,685 B2 | 7/2011 | Raghavendran |
| 8,586,853 B2 | 11/2013 | Sakazaki |
| RE44,893 E | 5/2014 | Raghavendran |
| 8,920,915 B2 | 12/2014 | Kumar |
| 2003/0109650 A1 | 6/2003 | Campbell |
| 2004/0192146 A1 | 9/2004 | Sturgill |
| 2005/0082721 A1 | 4/2005 | Hague |
| 2005/0182165 A1 | 8/2005 | Ma |
| 2005/0281999 A1 | 12/2005 | Hoffmann |
| 2006/0030647 A1 | 2/2006 | Ebeling |
| 2006/0148916 A1 | 7/2006 | Loh |
| 2006/0240242 A1 | 10/2006 | Raghavendran |
| 2007/0099524 A1 | 5/2007 | Porter |
| 2008/0213498 A1 | 9/2008 | Drzal |
| 2008/0289757 A1 | 11/2008 | Xie |
| 2008/0292848 A1 | 11/2008 | Xie |
| 2009/0054861 A1 | 2/2009 | Watson |
| 2009/0094061 A1 | 4/2009 | Xie |
| 2009/0142528 A1 | 6/2009 | Tilton |
| 2009/0292032 A1 | 11/2009 | Gupta |
| 2010/0021718 A1 | 1/2010 | Vos |
| 2010/0022710 A1 | 1/2010 | Xie |
| 2010/0098932 A1 | 4/2010 | Xie |
| 2011/0091713 A1 | 4/2011 | Miller |
| 2011/0256396 A1 | 10/2011 | Xie |
| 2011/0311783 A1 | 12/2011 | Xie |
| 2013/0101822 A1 | 4/2013 | Kunal |
| 2013/0244528 A1 | 9/2013 | Lowery |
| 2013/0310521 A1* | 11/2013 | Mukohata ............ C08F 110/06 525/461 |
| 2014/0134904 A1* | 5/2014 | Wang ................... B32B 5/026 442/1 |
| 2014/0155527 A1 | 6/2014 | Yang |
| 2014/0162020 A1 | 6/2014 | Wang |
| 2015/0099411 A1 | 4/2015 | Yang |

FOREIGN PATENT DOCUMENTS

| | | | |
|---|---|---|---|
| EP | 1897683 | * | 3/2008 |
| JP | H1149869 A | | 2/1999 |
| JP | H1160837 | | 3/1999 |
| WO | 2005082563 A1 | | 9/2005 |
| WO | 2009032062 | | 3/2009 |
| WO | 2009055046 | | 4/2009 |
| WO | 2009055047 | | 4/2009 |

* cited by examiner

Table 3

| | Heating Time (min) | Basis Weight (gsm) | COV | As-is Thickness (mm) | Lofted Thickness (mm) | Loft Ratio | Ash | Loft Index-1 (Ash-Norm) | MS content | Loft Index-2 (MS/Ash) |
|---|---|---|---|---|---|---|---|---|---|---|
| | | | | | Loft Temperature 200 | | | | | |
| H1100 | 1 | 784.13 | 1.36% | 0.915 | 3.770 | 3.119 | 38.35% | 8.1 | 4.92% | 105 |
| | 2 | 779.45 | 2.32% | 0.998 | 8.461 | 7.465 | 38.19% | 19.5 | 5.06% | 391 |
| | 3 | 775.82 | 1.84% | 1.09 | 9.206 | 8.120 | 38.30% | 21.2 | 4.87% | 416 |
| | 4 | 782.05 | 1.90% | 0.881 | 7.729 | 7.851 | 38.20% | 20.5 | 4.96% | 412 |
| M351 | 1 | 806.58 | 0.66% | 1.025 | 2.211 | 1.167 | 41.14% | 2.8 | 7.00% | 40 |
| | 2 | 807.64 | 0.94% | 0.947 | 3.934 | 3.154 | 41.00% | 7.7 | 7.00% | 110 |
| | 3 | 808.16 | 0.90% | 1.050 | 5.597 | 4.224 | 40.42% | 10.5 | 7.00% | 151 |
| | 4 | 806.99 | 0.81% | 1.168 | 5.880 | 4.001 | 40.00% | 10.1 | 7.00% | 144 |
| N400 | 1 | 806.38 | 1.22% | 0.962 | 2.226 | 1.314 | 40.96% | 3.3 | 7.00% | 47 |
| | 2 | 817.43 | 1.75% | 0.880 | 2.834 | 2.222 | 39.84% | 5.6 | 7.00% | 79 |
| | 3 | 811.37 | 1.84% | 1.01 | 3.279 | 2.278 | 40.79% | 5.6 | 7.00% | 80 |
| | 4 | 806.39 | 1.03% | 0.915 | 3.638 | 2.864 | 40.36% | 7.1 | 7.00% | 101 |

FIG. 12

Table 4

| | Heating Time (min) | Basis Weight (gsm) | COV | As-is Thickness (mm) | Lofted Thickness (mm) | Loft Ratio | Ash | Loft Index-1 (Ash-Norm) | MS content | Loft Index-2 (MS/Ash) |
|---|---|---|---|---|---|---|---|---|---|---|
| H1100 | 1 | 784.10 | 1.38% | 0.927 | 6.152 | 6.64 | 38.35% | 167 | 4.92% | 435 |
| | 2 | 779.45 | 2.32% | 1.060 | 8.928 | 8.37 | 38.19% | 219 | 5.00% | 458 |
| | 3 | 775.82 | 1.84% | 0.985 | 9.306 | 8.65 | 38.20% | 226 | 4.67% | 484 |
| | 4 | 783.06 | 1.90% | 0.995 | 7.982 | 8.02 | 38.20% | 210 | 4.96% | 423 |
| N351 | 1 | 805.96 | 0.66% | 0.924 | 2.002 | 2.13 | 41.14% | 52 | 7.00% | 74 |
| | 2 | 807.64 | 0.94% | 0.996 | 6.783 | 5.81 | 41.00% | 142 | 7.00% | 202 |
| | 3 | 808.16 | 0.96% | 1.017 | 7.961 | 6.93 | 40.42% | 169 | 7.00% | 241 |
| | 4 | 808.99 | 0.81% | 1.074 | 8.572 | 6.88 | 40.06% | 174 | 7.00% | 249 |
| N400 | 1 | 808.38 | 1.22% | 0.878 | 2.711 | 2.09 | 40.36% | 52 | 7.00% | 74 |
| | 2 | 817.43 | 1.75% | 0.898 | 4.049 | 3.51 | 39.84% | 88 | 7.00% | 126 |
| | 3 | 811.37 | 1.84% | 0.915 | 5.466 | 4.98 | 40.75% | 122 | 7.00% | 174 |
| | 4 | 806.39 | 1.03% | 0.992 | 5.670 | 4.93 | 40.36% | 123 | 7.00% | 174 |

FIG. 13

Table 6

| Sample | Burning Rate (in/min) | | Burning Distance (inch) | | Self-Extinguished | SE before the timing mark |
|---|---|---|---|---|---|---|
| | Before Expansion | After Expansion | Before Expansion | After Expansion | | |
| Control | 1.37 | | 4 | | NO | NO |
| EG-249C (5%) | 0.80 | 0.67 | 1.08 | 2.44 | YES | YES |
| EG-249C (10%) | 0.91 | 0.95 | 1.06 | 1.14 | YES | YES |
| EG-249C (15%) | N/A | 1.23 | N/A | 1.04 | YES | YES (SE immediately) |
| EG-HV (10%) | 0.92 | 0.98 | 1.08 | 1.16 | YES | YES |

FIG. 15

Table 7

| Sample | Burning Rate (in/min) | Burning Distance (inch) | Self-Extinguished | SE before the timing mark |
|---|---|---|---|---|
| Slightly expanded EG (Molding thickness: 2mm via convection oven @200deg/2.5min) | | | | |
| Control (H1100) | 1.5 | 4.0 | NO | NO |
| EG-HV (8%) | 1.1 | 1.4 | YES | YES |
| EG-KP251 (8%) | 1.7 | 2.4 | YES | NO |
| EG-351 (8%) | 0.9 | 1.5 | YES | YES |
| EG-249C (8%) | 1.1 | 1.1 | YES | YES |
| Fully expanded EG (Molding thickness: 8mm via IR oven @220deg/2min) | | | | |
| Control (H1100) | 1.2 | 4.0 | NO | NO |
| EG-HV (8%) | 1.1 | 1.2 | YES | YES |
| EG-KP251 (8%) | 0.7 | 2.6 | YES | NO |
| EG-351 (8%) | 0.8 | 1.1 | YES | YES |
| EG-249C (8%) | 0.9 | 1.4 | YES | YES |

FIG. 16

Table 8

| Process Temp (°C) | Free loft (mm) | Non-oil flammability | | | | Oil flammability | | | |
|---|---|---|---|---|---|---|---|---|---|
| | | 2mm | 4mm | 6mm | 8mm | 2mm | 4mm | 6mm | 8mm |
| 200 | 8.10 | 4SE/0, SE/B | 4B, SE/0 | 5B | | 5SE/0 | 5SE/0 | 5SE/0 | |
| 220 | 12.46 | 5SE/0 | SE/NBR, 4B | 3B, SE/NBR, SE/0 | 5B | 5SE/0 | 5SE/0 | 5SE/0 | 5SE/0 |
| 240 | 22.97 | 4SE/0, SE/NBR | SE/0, 4SE/NBR | 3B, 2SE/B | 3B, 2SE/0 | 5SE/0 | 5SE/0 | 5SE/0 | 5SE/0 |

FIG. 17

PREPREGS, CORES AND ARTICLES INCLUDING EXPANDABLE GRAPHITE MATERIALS

PRIORITY APPLICATION

This application is related to, and claims priority to and the benefit of, U.S. Provisional Application No. 62/079,288 filed on Nov. 13, 2014, the entire disclosure of which is hereby incorporated herein by reference for all purposes.

TECHNOLOGICAL FIELD

This application is related to composite articles that comprise one or more expandable graphite materials. In certain configurations, composite articles that include a thermoplastic core comprising a thermoplastic material, a plurality of reinforcing fibers and an expandable graphite material disposed or dispersed in the core are described.

BACKGROUND

Articles for automotive and construction materials applications typically are designed to meet a number of competing and stringent performance specifications.

SUMMARY

Certain configurations of the prepregs, cores and composite articles described herein provide desirable attributes including, but not limited to, more uniform loft across the surface of the articles, better acoustic properties, flame retardancy, enhanced processability and enhanced usability.

In a first aspect, a thermoplastic composite article comprising a porous core layer comprising a plurality of reinforcing fibers and a thermoplastic material, the porous core layer further comprising expandable graphite (EG) materials such as EG particles dispersed in the core layer, e.g., homogeneously dispersed in void space of the porous core layer, is provided.

In certain configurations, the expandable graphite materials such as particles are effective to increase the thickness of the porous core layer by at least 50% after radiant heating at or above a loft onset temperature of the expandable graphite materials (e.g., EG particles) and/or and the resin melting point. In other configurations, the expandable graphite material, such as EG particles, is selected to be substantially insensitive to loft upon convection heating. In some instances, the plurality of reinforcing fibers comprise at least one of glass fibers, aramid fibers, graphite fibers, carbon fibers, inorganic mineral fibers, metal fibers, metalized synthetic fibers, and metallized inorganic fibers. In other instances, the thermoplastic material comprises at least one of a polyethylene, a polypropylene, a polystyrene, a polyimide, a polyetherimide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In some embodiments, the thermoplastic material comprises particles and the average particle size of the particles of the thermoplastic material is about the same as the average particle size of the expandable graphite particles. In certain examples, the porous core layer provides flame retardancy and is halogen free. In some embodiments, a flame retardant agent can be present in the porous core layer, in which the flame retardant agent comprises at least one of N, P, As, Sb, Bi, S, Se, or Te. In other instances, the porous core layer provides flame retardancy and does not include a flame retardant agent. In some embodiments, the porous core layer can comprise a lofting agent in the porous core layer, e.g., another lofting agent where the expandable graphite material is also effective to function as a lofting agent.

In another aspect, a thermoplastic composite article comprising a porous core layer comprising a web of open celled structures comprising random crossing over of reinforcing fibers held together by a thermoplastic material, the porous core layer further comprising expandable graphite materials, e.g., EG particles, homogeneously dispersed in the web of open cell structures is disclosed.

In certain embodiments, the expandable graphite materials such as EG particles are effective to increase the thickness of the porous core layer by at least 50% after radiant heating above a loft onset temperature of the expandable graphite material, e.g., particles, and/or and the resin melting point. In other embodiments, the expandable graphite materials such as particles are selected to be substantially insensitive to loft upon convection heating. In further instances, the plurality of reinforcing fibers comprise at least one of glass fibers, aramid fibers, graphite fibers, carbon fibers, inorganic mineral fibers, metal fibers, metalized synthetic fibers, and metallized inorganic fibers. In other embodiments, the thermoplastic material comprises at least one of a polyethylene, a polypropylene, a polystyrene, a polyimide, a poly etherimide, an acrylonitrylstyrene, a butadiene, a polyethyleneterephthalate, a polybutyleneterephthalate, a polybutylenetetrachlorate, a polyvinyl chloride, a polyphenylene ether, a polycarbonate, a polyestercarbonate, a polyester, an acrylonitrile-butylacrylate-styrene polymer, an amorphous nylon, a polyarylene ether ketone, a polyphenylene sulfide, a polyaryl sulfone, a polyether sulfone, a poly(1,4 phenylene) compound, a silicone and mixtures thereof. In some examples, the thermoplastic material comprises particles and the average particle size of the particles of the thermoplastic material is about the same as the average particle size of the expandable graphite particles. In other instances, the average particle size of the expandable graphite is at least 50% of the average particle size of the thermoplastic material. In further examples, the porous core layer provides flame retardancy and is halogen free. In some embodiments, a flame retardant agent is provided in the porous core layer, in which the flame retardant agent comprises at least one of N, P, As, Sb, Bi, S, Se, or Te. In other instances, the porous core layer provides flame retardancy and does not include a flame retardant agent. In certain examples, the article may comprise a lofting agent in the porous core layer, e.g., another lofting agent where the expandable graphite material is also effective to function as a lofting agent.

In an additional aspect, a thermoplastic composite sheet comprising a porous core layer comprising a plurality of reinforcing fibers and a thermoplastic material, the porous core layer further comprising expandable graphite materials, e.g., EG particles, homogeneously dispersed in the core layer, e.g., in void space of the porous core layer, and a skin disposed on at least one surface of the porous core layer is disclosed.

In certain embodiments, the sheet comprises an additional porous core layer disposed between the porous core layer and the skin. In other embodiments, the additional porous core layer comprises a thermoplastic material, a plurality of reinforcing fibers and expandable graphite materials such as EG particles. In further examples, the expandable graphite materials such as EG particles of the additional porous core layer are homogeneously dispersed in the additional porous core layer. In some embodiments, the expandable graphite materials (e.g., EG particles) of the additional porous core layer are gradient distributed in the additional porous core layer. In certain configurations, the porous core layer provides flame retardancy and is halogen free. In some embodiments, the porous core layer provides flame retardancy and does not include a flame retardant agent. In certain embodiments, the expandable graphite materials (e.g., EG particles) are effective to increase the thickness of the porous core layer by at least 50% after radiant heating above a loft onset temperature of the expandable graphite particles. In some examples, the sheet comprises a lofting agent in the porous core layer, e.g., another lofting agent where the expandable graphite material is also effective to function as a lofting agent.

In another aspect, a thermoplastic composite sheet comprising a porous core layer comprising a web of open celled structures comprising random crossing over of reinforcing fibers held together by a thermoplastic material, the porous core layer further comprising expandable graphite material (e.g., EG particles) homogeneously dispersed in the web of open cell structures; and a skin disposed on at least one surface of the porous core layer is provided.

In certain instances, the sheet further comprises an additional porous core layer disposed between the porous core layer and the skin. In some embodiments, the additional porous core layer comprises a thermoplastic material, a plurality of reinforcing fibers and expandable graphite materials such as EG particles. In other examples, the expandable graphite material (e.g., EG particles) of the additional porous core layer are homogeneously dispersed in the additional porous core layer. In some embodiments, the expandable graphite materials such as EG particles of the additional porous core layer are gradient distributed in the additional porous core layer. In some configurations, the porous core layer provides flame retardancy and is halogen free. In other configurations, the porous core layer provides flame retardancy and does not include a flame retardant agent. In some embodiments, the expandable graphite materials such as EG particles are effective to increase the thickness of the porous core layer by at least 50% after radiant heating above a loft onset temperature of the expandable graphite particles. In other instances, the sheet comprises a lofting agent in the porous core layer, e.g., another lofting agent where the expandable graphite material is also effective to function as a lofting agent. In some embodiments, the skin may comprise expandable graphite particles.

In an additional aspect, a thermoplastic composite sheet comprising a porous core layer comprising a web of open celled structures comprising random crossing over of reinforcing fibers held together by a thermoplastic material, the porous core layer further comprising non-covalently bonded expandable graphite materials, e.g., non-covalently bonded expandable graphite particles, homogeneously dispersed in the web of open cell structures, and a skin disposed on at least one surface of the porous core layer is described.

In certain embodiments, the sheet may comprise covalently bonded expandable graphite materials such as EG particles dispersed in the web. In some configurations, the non-covalently bonded expandable graphite materials, e.g., EG particles and the covalently bonded expandable graphite materials, e.g., EG particles, are present in about the same amount. In other instances, the covalently bonded graphite materials such as EG particles are present in a gradient distribution in the web. In some embodiments, the non-covalently bonded expandable graphite materials such as EG particles are present in a flame retardant amount. In certain examples, the porous core layer provides flame retardancy and is halogen free. In further embodiments, the sheet may comprise a flame retardant agent in the porous core layer, in which the flame retardant agent comprises at least one of N, P, As, Sb, Bi, S, Se, or Te. In other embodiments, the expandable graphite materials, e.g., EG particles, are effective to increase the thickness of the porous core layer by at least 50% after radiant heating above a loft onset temperature of the expandable graphite materials, e.g., EG particles. In other instances, the sheet comprises a lofting agent in the porous core layer, e.g., another lofting agent where the expandable graphite material is also effective to function as a lofting agent. In some embodiments, the skin may comprise covalently bonded expandable graphite materials such as EG particles or non-covalently bonded expandable graphite materials such as EG particles.

In another aspect, a method comprising combining a thermoplastic material, reinforcing fibers and expandable graphite material, e.g., EG particles, in a mixture to form an agitated aqueous foam, disposing the agitated aqueous foam onto a wire support, evacuating the water to form a web, and heating the web to a first temperature above the melting temperature of the thermoplastic material, in which the first temperature is below a loft onset temperature of the expandable graphite material (e.g., EG particles) so substantially no loft occurs is provided. If desired, pressure can be applied to the web to provide a thermoplastic composite sheet comprising the expandable graphite materials such as EG particles homogeneously dispersed in the web is provided.

In certain instances, the evacuating step removes less than 5% of the expanded graphite materials, e.g., EG particles, in the agitated aqueous form disposed on the wire support. In other embodiments, the method comprises mixing the agitated aqueous foam until the expandable graphite material such as EG particles are homogeneously dispersed in the agitated aqueous foam. In some embodiments, the method comprises heating the web using convection heating. In certain embodiments, the method comprises applying pressure to the thermoplastic composite sheet. In some examples, the method comprises heating the thermoplastic composite sheet using radiant heating. In other configurations, the method comprises disposing additional expandable graphite materials, e.g., EG particles on a surface of the thermoplastic composite sheet. In some embodiments, the method comprises adding a lofting agent to the agitated aqueous foam. In further examples, the method comprises coupling the thermoplastic composite sheet to a skin. In some examples, the method comprises coupling the thermoplastic composite sheet to an additional thermoplastic composite sheet comprising a thermoplastic material, reinforcing fibers and expandable graphite material such as EG particles. In some embodiments, the method comprises selecting the thermoplastic material to comprise particles and selecting an average particle size for the expandable graphite particles to be about the same as an average particle size of the particles of thermoplastic material.

In an additional aspect, a method comprising combining a thermoplastic material, reinforcing fibers and expandable graphite materials, e.g., EG particles, in a mixture, mixing the mixture to provide a substantially uniform dispersion of the expandable graphite material, e.g., EG particles, in the mixture, disposing the mixture onto a wire support, evacuating the water from the disposed mixture to form a web, and heating the web under first heating conditions to melt the thermoplastic material without any substantial lofting of the expandable graphite material such as EG particles is provided. In certain configurations, pressure can be applied to the web to provide a thermoplastic composite sheet comprising the expandable graphite particles dispersed in the web.

In certain examples, the evacuating step removes less than 5% of the expanded graphite material such as EG particles in the mixture disposed on the wire support. In other examples, pressure is applied without resulting in covalent bonding of the expandable graphite material, e.g., EG particles, in the web to the thermoplastic material or the reinforcing fibers. In other instances, the method comprises heating the web using convection heating. In certain examples, the method comprises applying pressure to the heated thermoplastic composite sheet. In further examples, the method comprises heating the thermoplastic composite sheet using radiant heating. In other configurations, the method comprises disposing additional expandable graphite material such as EG particles on a surface of the thermoplastic composite sheet. In some embodiments, the method comprises adding a lofting agent to the mixture. In some embodiments, the method comprises coupling the thermoplastic composite sheet to a skin. In certain examples, the method comprises coupling the thermoplastic composite sheet to an additional thermoplastic composite sheet comprising a thermoplastic material, reinforcing fibers and expandable graphite material such as EG particles. In some embodiments, the method comprises selecting the thermoplastic material to comprise particles and selecting an average particle size for the expandable graphite particles to be about the same as an average particle size of the particles of thermoplastic material or selecting the average particle size of the expandable graphite particles to be about 50% or more of the average size of the thermoplastic material particles.

In another aspect, a thermoplastic composite article comprising a porous core layer comprising a plurality of reinforcing fibers and a thermoplastic material, the porous core layer further comprising expandable graphite material such as EG particles dispersed in void space of the porous core layer is provided. In certain instances, the expandable graphite material such as EG particles are non-covalently bonded expandable graphite materials, e.g., non-covalently bonded expandable graphite particles.

In an additional aspect, a thermoplastic composite article comprising a porous core layer comprising a web of open celled structures comprising random crossing over of reinforcing fibers held together by a thermoplastic material, the porous core layer further comprising expandable graphite material, e.g., EG particles, dispersed in the web of open cell structures is described. In some instances, the expandable graphite material such as EG particles is non-covalently bonded expandable graphite material, e.g., non-covalently bonded expandable graphite particles.

In another aspect, a thermoplastic composite sheet comprising a porous core layer comprising a plurality of reinforcing fibers and a thermoplastic material, the porous core layer further comprising expandable graphite material, e.g., EG particles, dispersed in void space of the porous core layer, and a skin disposed on at least one surface of the porous core layer is described. In some configurations, the expandable graphite material is non-covalently bonded expandable graphite material, e.g., non-covalently bonded expandable graphite particles.

In an additional aspect, a thermoplastic composite sheet comprising a porous core layer comprising a web of open celled structures comprising random crossing over of reinforcing fibers held together by a thermoplastic material, the porous core layer further comprising expandable graphite material, e.g., EG particles, dispersed in the web of open cell structures, and a skin disposed on at least one surface of the porous core layer is provided. In some embodiments, the expandable graphite material is non-covalently bonded expandable graphite material, e.g., non-covalently bonded expandable graphite particles.

In another aspect, a prepreg comprising a web of open cell structures formed by a plurality of reinforcing fibers held together by a thermoplastic material, the prepreg comprising expandable graphite material such as EG particles dispersed in the web of open cell structures is disclosed. In certain examples, the expandable graphite material is non-covalently bonded expandable graphite material, e.g., non-covalently bonded expandable graphite particles.

In an additional aspect, a thermoplastic article comprising a porous core layer comprising a plurality of reinforcing fibers and a thermoplastic material, the porous core layer further comprising expandable graphite material, e.g., EG particles, homogeneously dispersed in void space of the porous core layer, in which the expandable graphite material such as EG particles are present in an effective amount to permit the article to meet/pass the Federal Motor Vehicle Safety Standard 302 (FMVSS 302) flammability test dated 1991 is described. In some examples, the expandable graphite material is non-covalently bonded expandable graphite material, e.g., non-covalently bonded expandable graphite particles.

In another aspect, a thermoplastic article comprising a porous core layer comprising a web of open celled structures comprising random crossing over of reinforcing fibers held together by a thermoplastic material, the porous core layer further comprising expandable graphite material, e.g., EG particles, homogeneously dispersed in the web of open cell structures, in which the expandable graphite material (such as EG particles) is present in an effective amount to permit the article to meet/pass the Federal Motor Vehicle Safety Standard 302 (FMVSS 302) flammability test dated 1991 is disclosed. In certain instances, the expandable graphite material is non-covalently bonded expandable graphite material, e.g., non-covalently bonded expandable graphite particles.

In an additional aspect, a thermoplastic composite sheet comprising a porous core layer comprising a plurality of reinforcing fibers and a thermoplastic material, the porous core layer further comprising expandable graphite material such as EG particles homogeneously dispersed in void space of the porous core layer, in which the expandable graphite material, e.g., EG particles, is present in an effective amount to permit the article to meet/pass the Federal Motor Vehicle Safety Standard 302 (FMVSS 302) flammability test dated 1991, and a skin disposed on at least one surface of the porous core layer is provided. In certain embodiments, the expandable graphite material is non-covalently bonded expandable graphite material, e.g., non-covalently bonded expandable graphite particles.

In another aspect, a thermoplastic composite sheet comprising a porous core layer comprising a web of open celled structures comprising random crossing over of reinforcing fibers held together by a thermoplastic material, the porous core layer further comprising expandable graphite material such as EG particles homogeneously dispersed in the web of open cell structures, in which the expandable graphite material is present in an effective amount to permit the article to meet/pass the Federal Motor Vehicle Safety Standard 302 (FMVSS 302) flammability test dated 1991, and a skin disposed on at least one surface of the porous core layer is disclosed. In certain embodiments, the expandable graphite material is non-covalently bonded expandable graphite material, e.g., non-covalently bonded expandable graphite particles.

In an additional aspect, a method of producing a thermoplastic composite article comprising a plurality of reinforcing fibers, a thermoplastic material and expandable graphite material, e.g., EG particles, by heating the reinforcing fibers, the thermoplastic material and the expandable graphite material such as EG particles to a first temperature above a melting point of the thermoplastic material and below a loft onset temperature of the expandable graphite material (e.g., below a loft onset temperature of EG particles) is provided.

In certain embodiments, the method comprises heating the produced article to a second temperature above the loft onset temperature of the expandable graphite material, e.g., EG particles, to loft the thermoplastic article. In other embodiments, the method comprises selecting the second temperature to be at least 20 degrees Celsius above the first temperature. In further embodiments, the method comprises selecting the second temperature to be at least 40 degrees Celsius above the first temperature. In additional examples, the method comprises selecting the second temperature to be at least 60 degrees Celsius above the first temperature.

In another aspect, a method of producing a thermoplastic composite article comprising a plurality of reinforcing fibers, a thermoplastic material and expandable graphite material, e.g., EG particles, by heating the reinforcing fibers, the thermoplastic material and the expandable graphite material such as EG particles under first heating conditions to melt the thermoplastic material while avoiding any substantial loft of the expandable graphite material (e.g., avoid any substantial loft of EG particles) is disclosed.

In certain examples, the first heating conditions comprise convection heating. In other examples, the method comprises heating the produced article under second heating conditions to loft the expandable graphite material, e.g., to loft the EG particles. In certain embodiments, the second heating conditions comprise radiant heating, e.g., when the first heating conditions comprise convection heating.

Additional features, aspect, examples, configurations and embodiments are described in more detail below.

BRIEF DESCRIPTION OF THE FIGURES

Certain embodiments are described with reference to the accompanying figures in which:

FIG. 12 includes Table 3, in accordance with certain examples;

FIG. 13 includes Table 4, in accordance with certain examples;

FIG. 15 includes Table 6, in accordance with certain examples;

FIG. 16 includes Table 7, in accordance with certain examples;

FIG. 17 includes Table 8, in accordance with certain embodiments; and

Figure 1A:
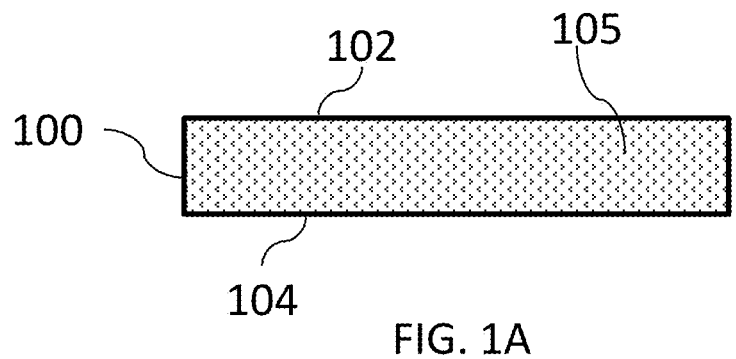
FIG. 1A is an illustration of a prepreg (or core), in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar materials, if desired. In some instances, core layers that comprise expandable graphite materials are shown as including stubble or dots for illustration purposes. The arrangement of the stubbles and dots is not intended to imply any particular distribution unless otherwise specified in the context of describing the particular figure.

DETAILED DESCRIPTION

Certain embodiments are described below with reference to singular and plural terms in order to provide a more user friendly description of the technology disclosed herein. These terms are used for convenience purposes only and are not intended to limit the prepregs, cores, articles, composites and other subject matter as including or excluding certain features unless otherwise noted as being present in a particular embodiment described herein.

Certain articles described herein are noted to meet either the FMVSS 302 test or the SAE J369 test standard. These tests are generally equivalent and are used to determine burning rate measurements. In brief, the tests use a horizontal flame chamber, a fume hood, a tote large enough to handle specimens of about 12 inches in length, a water source, a timer, a lighter and a ruler. The specimen size is about 4 inches by about 12 inches with 5 or more specimens typically being tested. The adhesive side of the specimen is typically subjected to the flame. For FMVSS 302 tests, the fume hood is typically opened enough to provide an air flow of about 150 cubic feet per minute. For the SAE J369 test, the fume hood, for example, may be opened to provide the same air flow or may be opened all the way. Unless otherwise noted herein, the FMVSS 302 test can be interchanged with the SAE J369 test. The results of these tests can be classified in several ways including DNI, SE/0, SE/NBR, SE/B, B, and RB. DNI refers to the material not supporting combustion during or following a 15 second ignition period and/or the material not transmitting a flame front across either surface to a selected distance. SE/0 refers to the material igniting on the surface, but the flame extinguishes itself before it moves a selected distance. SE/NBR refers to the material stopping burning before it has burned for 60 seconds from the start of timing and not burning more than about 50 mm from the point where timing was started. SE/B refers to the leading flame front progressing a selected distance but extinguishing itself before reaching a second distance. B refers to the material burning the entire distance. RB refers to the materials that burn so rapidly it is not possible to time the burning rate. One or more of burn distance, burn time, burn rate, and whether the material is self-extinguishing may also be measured. Specimens may be considered to "meet" or "pass" the FMVSS 302 or SAE J369 tests if the flame travels less than about 102 mm per minute. Specimens may fail the tests if they burn faster than 102 mm per minute.

In certain instance, thermoplastic composite articles are often molded or processed into various shapes to provide a final formed part or article. During processing, it may be desirable to increase the overall thickness of one or more components or layers of the article to be processed. In some configurations described herein, the presence of expandable graphite materials in a thermoplastic prepreg or a thermoplastic core permits alteration of the overall thickness of the article (or a portion thereof) during heating, molding or other temperature or processing operations. In some instances, the expandable graphite materials are dispersed, e.g., in a substantially uniform distribution from surface to surface, in void space of a thermoplastic prepreg or core comprising a thermoplastic material and a plurality of fibers. In certain examples, the expandable graphite materials are non-covalently bonded to the other materials in the prepreg or core. In further examples, the expandable graphite materials can be covalently bonded to one or more groups present in the thermoplastic material or covalently bonded to one or more groups of the plurality of fibers or both. The exact lofting temperature used can vary depending on the other materials present in the prepregs, cores and articles, and in some instances, the lofting temperature may be greater than or equal to the melting point temperature of the thermoplastic material(s) present in the prepregs, cores and articles.

In certain configurations, the articles described herein can comprise a prepreg or core layer. While not wishing to be bound by any particular theory, a prepreg is generally not a fully cured or processed version of a core. For example, a partially cured layer comprising a thermoplastic material, a plurality of fibers and expandable graphite materials is generally referred to as a prepreg, whereas a fully cured layer (which may or may not yet be lofted) comprising thermoplastic material, a plurality of fibers and expandable graphite materials is generally referred to as a core or core layer. As noted herein, even though the core may be considered cured, the core can still be further processed to increase its thickness, to alter its shape or to otherwise provide a formed article or product suitable for an intended use. The description below makes reference to both a prepreg and a core and the materials (and their amounts and properties) used in connection with a prepreg can also be used in a core if desired.

In certain configurations described herein, expandable graphite (EG) materials are included in the prepregs core and articles to provide for selective lofting of the prepregs, cores and articles. Lofting generally refers to an overall increase in thickness of the prepreg, core or article during or after a processing condition, e.g., application of heat and/or pressure. For example, EG materials can be selected such that the prepreg, core or article is substantially insensitive to loft at a first temperature and/or first heating conditions and then is sensitive to loft at a second temperature and/or second heating conditions. In some instances, prepregs, cores and articles comprising EG materials do not loft to a substantial degree under convection heating conditions, whereas, the prepregs, cores and articles comprising EG materials do loft under infrared heating conditions. In other instances, the prepregs, cores and articles comprising EG materials do not loft to a substantial degree at a first temperature and then do loft to a substantial degree at a second temperature. For example, in certain automotive applications, the EG material can be selected to not substantially loft at 200 deg. Celsius and to loft at 220 deg. Celsius. While not wishing to be bound by any particular theory, the first and second temperatures can vary depending on the thermoplastic material present in the prepreg, core or article. In certain instances, the EG material is selected such that substantially no loft occurs until the loft temperature is about 20 deg. Celsius or more than higher the melting point of the thermoplastic material. In other instances, the EG material is selected such that substantially no loft occurs until the loft temperature is about 40 deg. Celsius or more higher than the melting point of the thermoplastic material. In further instances, the EG material (and/or the lofting conditions) is selected such that substantially no loft occurs until the loft temperature is about 60 deg. Celsius or more higher than the melting point of the thermoplastic material. In some instances, the EG material is selected such that substantially no loft occurs until the loft temperature is about 80 deg. Celsius or more higher than the melting point of the thermoplastic material.

In some instances, the prepregs, cores and articles described herein are porous or permeable materials that comprise open cell structures, e.g., voids. The presence of such open cell structures renders it more difficult for the prepregs, cores and articles to be flame retardant as air trapped within the porous structures will support flammability and/or make it more difficult for the component to self-extinguish. By including an EG material in combination with a thermoplastic material and fibers, the prepregs, cores and article can be flame retardant and/or self-extinguishing. For example, an article comprising a porous core layer comprising a plurality of reinforcing fibers, a thermoplastic material, and an effective amount of expandable graphite particles to meet the Federal Motor Vehicle Safety Standard 302 (FMVSS 302) flammability test dated 1991, which is generally equivalent to ISO 3795 dated 1989 and ASTM D5132 dated 2004, can be produced. If desired, the EG material can be homogeneously dispersed in void space of the porous core layer. Skins of other materials may also be disposed on the porous core layer if desired.

In certain configurations, a porous prepreg comprising one or more thermoplastic materials and a plurality of fibers that together have an open cell structure, e.g., void space, can be produced. In some configurations, expandable graphite materials can be loaded into the void space in a manner where the expandable graphite materials generally do not covalently bond with the thermoplastic materials and/or the fibers. For example, the thermoplastic materials and/or the fibers can be selected so that they are generally inert or non-reactive with the expandable graphite materials. Even though the expandable graphite material may not covalently bond to the thermoplastic material and/or the fibers, there typically is covalent bonding present in or within the expandable graphite material itself. In other instances, it may be desirable to covalently bond the expandable graphite materials to the thermoplastic materials, the fibers or both to provide some covalently bonded expandable graphite materials in the prepreg. Even where bonded expandable graphite materials are present, the expandable graphite materials desirably can still increase their occupied volume under suitable conditions such as, for example, radiant heating to permit lofting of the prepreg. In some instances, both covalently bonded expandable graphite materials and non-covalently bonded expandable graphite materials may also be present in the prepreg. While some configurations of the prepregs may comprise expandable graphite materials where about 100% of the expandable graphite materials are non-covalently bonded, weak interactions such as van der Waals' interactions or electrostatic interactions can take place between the expandable graphite materials and the other components of the prepreg.

Figure 2A:
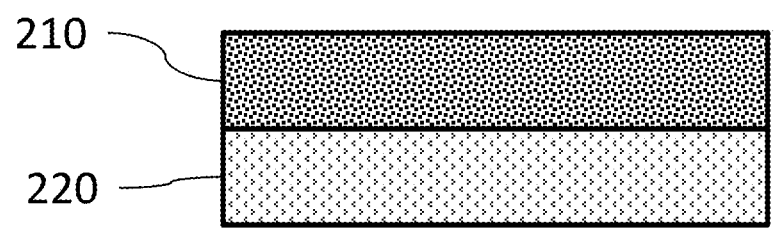
FIG. 2A is an illustration of two prepregs, in accordance with certain configurations.
Figure 2B:
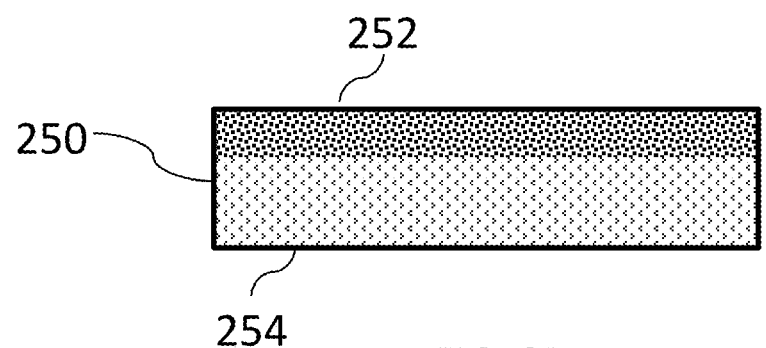
FIG. 2B is an illustration of a composite formed the two prepregs of FIG. 2A are coupled to each other, in accordance with certain embodiments.

In certain examples and referring to FIG. 1A, a prepreg 100 is shown that comprises a thermoplastic material and a plurality of fibers. The prepreg 100 also comprises expandable graphite materials (shown for illustration purposes as dots 105) dispersed through the prepreg 100. In some instances, the expandable graphite material dispersion can be substantially homogeneous or substantially uniform from a first surface 102 to a second surface 104 of the prepreg 100. As described in more detail herein, to achieve such substantially homogeneous or substantially uniform distribution of expandable graphite materials in the prepreg 100, the components of the prepreg 100 can be mixed together to form a dispersion. Mixing can be performed until the dispersion comprises a substantially homogeneous or substantially uniform mixture of the expandable graphite materials, the thermoplastic materials and the fibers in the dispersion. The prepreg 100 may then be formed as described herein, e.g., by disposing the dispersion on a wire screen using a suitable laying process. In other configurations, it may be desirable to provide a gradient distribution of expandable graphite materials from the surface 102 to the surface 104 such that more expandable graphite materials are present toward one of the surface 102, 104 than the other surface. In some embodiments, a substantially uniform distribution of expandable graphite materials is present in a prepreg 100 and then additional expandable graphite materials are added to one side of the prepreg 100 to provide a gradient distribution. Such additional expandable graphite materials can be added directly to the prepreg 100, e.g., by spraying or coating a solution comprising the expandable graphite material, or can be added by coupling a skin, additional prepreg or other component comprising expandable graphite materials to the prepreg 100. For example and referring to FIG. 2A, a first prepreg 210 and a second prepreg 220 disposed on the first prepreg 210 is shown. Each of the first prepreg 210 and the second prepreg 220 comprises a substantially uniform distribution of expandable graphite materials, but the amount of expandable graphite materials in the prepregs 210, 220 is different. If desired, however, only one of the prepregs 210, 220 may comprise expandable graphite material and the other prepreg may not comprise a lofting agent or may comprise a lofting agent other than expandable graphite material, e.g., microspheres. The microspheres may be present in combination with the expandable graphite material or may be present in one of the prepregs 210, 220 without any expandable graphite material. The thermoplastic materials of the prepregs 210, 220 can be melted to provide a single prepreg 250 (FIG. 2B). The result of melting of the prepregs 210, 220 together is a gradient distribution of expandable graphite materials in the prepreg 250 with increased amounts of expandable graphite materials adjacent to a surface 252 as compared to the amount present adjacent to a surface 254. The exact overall thickness of the prepreg 250 may vary depending on the conditions used and no particular thickness is intended to be implied in FIG. 2B.

Figure 2C:
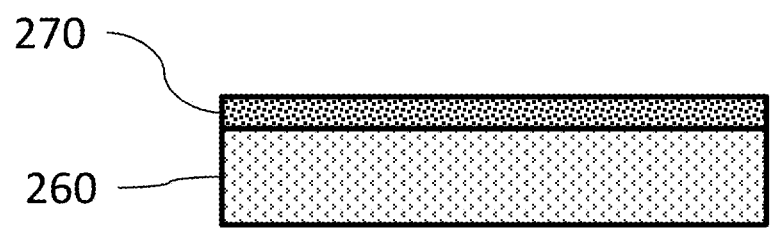
FIG. 2C is an illustration of a skin disposed on the prepreg, in accordance with certain examples.

In other configurations, a distribution of expandable graphite materials in a prepreg can be provided by coupling a skin or other material comprising expandable graphite materials to the prepreg. Referring to FIG. 2C, a skin 270 comprising expandable graphite materials is shown as being disposed on a prepreg 260 comprising a thermoplastic material, reinforcing fibers and expandable graphite materials. While not required, the skin 270 is typically present at a much lower thickness than a pre-lofted thickness of the prepreg 260. In addition, a discernible interface is typically present between the skin 270 and the interface 260, whereas coupling of two prepregs to each other, as described in connection with FIG. 2B, generally does not result in any discernible interface in the finally coupled prepreg 250. In other instances, the skin 270 can be melted into the prepreg 260 to couple the skin 270 and the prepreg 260 to leave a coupled skin/prepreg composite material without any substantial interface. If desired and as described in more detail below, an additional skin, which may or may not comprise expandable graphite materials, can also be coupled to the prepreg on an opposite side from the skin 270.

In certain configurations, the thermoplastic material of the prepreg may be present in fiber form, particle form, resin form or other suitable forms. In some instances, the thermoplastic material used in the prepreg can be present in particle form and have an average particle size that is substantially the same as the average particle size of the expandable graphite materials. While not wishing to be bound by any particular scientific theory, by matching the particles sizes of the thermoplastic material and the expandable graphite materials, enhanced processing of the prepregs including, for example, increased retention of the expandable graphite materials in the prepreg can be achieved. In some instances, the average particle size of the expandable graphite materials and the average particle size of the thermoplastic material can vary by about 5% to about 10% and enhanced processing can still be achieved. In certain configurations, the average particle size of each of the thermoplastic material and the expandable graphite materials in the prepreg can differ by about 50 microns to about 90 microns. In some configurations, the average particle size of the expandable graphite is at least 50% of the average particle size of the thermoplastic material particles to provide for enhanced processing. In other instances, expandable graphite materials with an average particle size about the same as the average particle size of the thermoplastic material can be present along with expandable graphite materials of an average particle size that is different than the average particle size of the thermoplastic material. Even though the average particle size of the expandable graphite materials may differ, the chemical composition of the expandable graphite materials can be the same or can be different. In yet other configurations, two or more thermoplastic materials with different average particle sizes can be present. If desired, two expandable graphite materials with average particle sizes that are substantially the same as the average particle sizes of the thermoplastic materials can be present. The two expandable graphite materials may be chemically the same or may be chemically distinct. Similarly, the thermoplastic materials can be chemically the same (but have a different average particle size) or can be chemically distinct.

In certain embodiments, the prepreg 100 generally comprises a substantial amount of open cell structure such that void space is present in the prepreg. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg comprises a porosity or void content of greater than 0%, e.g., is not fully consolidated, up to about 95%. Unless otherwise stated, the reference to the prepreg comprising a certain void content or porosity is based on the total volume of the prepreg and not necessarily the total volume of the prepreg plus any other materials or layers coupled to the prepreg.

Figure 1B:
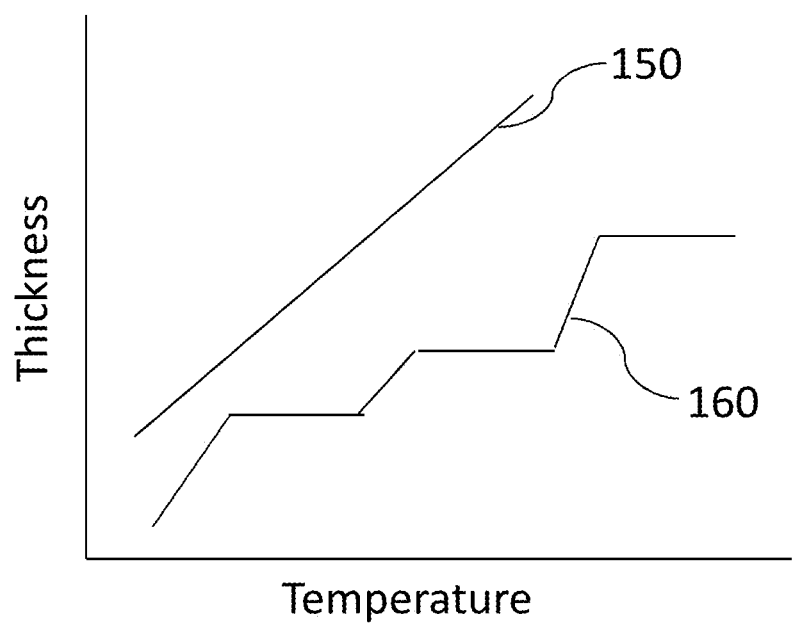
FIG. 1B shows hypothetical lofting curves for two different lofting agents, in accordance with certain examples.

In certain embodiments, the high porosity present in the prepreg permits trapping of expandable graphite materials within the pores of the prepreg. For example, expandable graphite materials can reside in the void space in a non-covalently bonded manner. Application of heat or other perturbations can act to increase the volume of the non-covalently bonded expandable graphite materials which in turn increases the overall thickness of the prepreg, e.g., the thickness increases as the size of the expandable graphite material increases and/or additional air becomes trapped in the prepreg. For example, the expandable graphite materials can be operative as a lofting agent such that application of a suitable stimulus, e.g., radiant heat, functions to increase the overall thickness of the prepreg. In some instances, the expandable graphite material in the prepreg is effective to function as a step-wise lofting agent. As used herein, step-wise lofting or a step-wise lofting agent refers to a lofting agent whose thickness increases with temperature, then plateaus, then increases again with increasing temperature. Referring to the illustration in FIG. 1B, two hypothetical lofting curves are shown with one curve 150 representing a linear lofting agent such as a microsphere, for example, and the other curve 160 representing a step-wise lofting agent such as an expandable graphite material, for example. The volume of linear lofting agent generally increases linearly as a function of increasing temperature. The slope tends to be steep as many lofting agents, such as microsphere lofting agents, function in a binary manner and go from non-lofted to fully lofted at a certain temperature. In contrast, the volume of a step-wise lofting agent generally increases in steps as a function of temperature. The step-wise increase in volume provides for enhanced control of overall prepreg thickness and reduces the likelihood of over-loft. A desired thickness using a prepreg comprising an expandable graphite material can be achieved by selecting a suitable processing temperature. If the thickness is not sufficient, in many instances, a higher temperature can then be applied to increase overall thickness to a desired thickness.

In certain embodiments, the thermoplastic material of the prepregs described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the prepreg can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg can vary and illustrative amounts range from about 20% by weight to about 80% by weight.

In certain examples, the fibers of the prepregs described herein can comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the expandable graphite materials or both. In some instances, the fibers used in the prepreg can first be reacted with the expandable graphite material to provide a derivatized fiber that is then mixed with the thermoplastic material. Alternatively, the expandable graphite material can be reacted with the thermoplastic material of the prepreg to provide a derivatized thermoplastic material that is then mixed with the fibers. The fiber content in the prepreg may be from about 20% to about 90% by weight of the prepreg, more particularly from about 30% to about 70%, by weight of the prepreg. Typically, the fiber content of a composite article comprising the prepreg varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material and expandable graphite material to provide a prepreg generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In certain examples, the expandable graphite materials of the prepregs described herein comprise one or more graphene based materials typically present in stacked molecular layers. While not wishing to be bound by any particular theory, in addition to providing lofting capabilities, the expandable graphite materials also provides some degree of flame retardancy. In some embodiments, enough expandable graphite materials is present, e.g., a flame retardant amount of expandable graphite materials is present, in the prepreg such that the prepreg meets the Federal Motor Vehicle Safety Standard 302 (FMVSS 302) flammability test dated 1991, which is generally equivalent to ISO 3795 dated 1989 and ASTM D5132 dated 2004. Such flame retardant amounts can permit construction of a prepreg that is substantially free of external flame retardant agents.

The exact type of expandable graphite materials used in the prepreg can depend on numerous factors including, for example, the desired lofting temperature, the desired flame retardancy. Illustrative commercially available expandable graphite materials are available from Nyacol Nano Technologies, Inc. (Ashland, Mass.) and include, for example, grades 35, 200, 249, 250, 251, KP251 and 351 expandable graphite materials. Additional expandable graphite material can be purchased commercially from Graftech International (Lakewood, Ohio). While not wishing to be bound by any particular reaction, expandable graphite material can generally be produced by acidifying a graphite ore. Acidification results in an intercalation process, e.g., where sulfuric acid acts as an intercalator. The solution can then be neutralized to provide a series of layers of sheets of hexagonal carbon-carbon bonded materials. The layers are generally flat and interact with additional hexagonal carbon-carbon layers to provide a layered sheet structure. The layered sheet structure can be held together through covalent bonding or electrostatic interactions (or both) between sheets. Heating of the expandable graphite material in the thermoplastic prepregs and cores described herein can result in increased separation between layers and a resulting increase in thickness of the prepreg. If desired, the expandable graphite material can be oxidized using a suitable oxidant to form a graphene oxide. As noted herein, the expandable graphite material can be present in many forms including flake form, particle form or other forms. In some instances, the expandable graphite material is present in particle form and may comprise an average particle size of at least 300 microns, for example.

In some configurations, the prepreg may be a substantially halogen free or halogen free prepreg to meet the restrictions on hazardous substances requirements for certain applications. In other instances, the prepreg may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg), more particularly about 1 weight percent to about 13 weight percent, e.g., about 5 weight percent to about 13 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the prepreg), more particularly about 1 weight percent to about 15 weight percent, e.g., about 2 weight percent to about 14 weight percent based on the weight of the prepreg. The flame retardant agents used in the prepregs described herein can be added to the mixture comprising the expandable graphite material, thermoplastic material and fibers (prior to disposal of the mixture on a wire screen or other processing component) or can be added after the prepreg is formed.

In certain configurations, the articles described herein may comprise a porous core. In certain examples, the porous core comprises one or more thermoplastic materials and a plurality of fibers that can be held in place by the cured thermoplastic material in a web or network structure to provide a plurality of open cells, void space or a web in the core. In some instances, expandable graphite materials can be present in the void space of the core in a manner where the expandable graphite materials generally do not covalently bond with the thermoplastic materials and/or the fibers. For example, the thermoplastic materials and/or the fibers can be selected so that they are generally inert or non-reactive with the expandable graphite materials. Even though the expandable graphite material may not covalently bond to the thermoplastic material and/or the fibers, there typically is covalent bonding present in or within the expandable graphite material itself, e.g., the expandable graphite material layers may be associated with each other through one or more intercalating agents. In other instances, it may be desirable to covalently bond the expandable graphite materials to the thermoplastic materials, the fibers or both to provide some covalently bonded expandable graphite materials in the core. Even where bonded expandable graphite materials are present in the core, the expandable graphite materials desirably can still increase their occupied volume under suitable conditions such as, for example, radiant heating to permit lofting of the core. In some instances, both covalently bonded expandable graphite materials and non-covalently bonded expandable graphite materials may also be present in the core. While some configurations of the core may comprise expandable graphite materials where about 100% of the expandable graphite materials are non-covalently bonded, weak interactions such as van der Waals' interactions or electrostatic interactions can take place between the expandable graphite materials and the other components of the core, e.g., charge-charge interactions or hydrophobic interactions can take place between the various components present in the core.

In certain configurations, a core similar to the prepreg of FIG. 1 can be produced. The core comprises expandable graphite materials dispersed throughout the core. In some instances, the expandable graphite material dispersion can be substantially homogeneous or substantially uniform from a first surface to a second surface of the core. As described in more detail herein, to achieve such substantially homogeneous or substantially uniform distribution of expandable graphite materials in the core, the components of the core can be mixed together to form a dispersion. Mixing can be performed until the dispersion comprises a substantially homogeneous or substantially uniform mixture of the expandable graphite materials, the thermoplastic materials and the fibers in the dispersion. The core may then be formed as described herein, e.g., by disposing the dispersion on a wire screen using a suitable laying process followed by curing of the thermoplastic material of the core. In other configurations, it may be desirable to provide a gradient distribution of expandable graphite materials from one surface of the core to the other surface of the core. In some configurations, a substantially uniform distribution of expandable graphite materials is present in a core and then additional expandable graphite materials are added to one side of the core to provide a gradient distribution. Such additional expandable graphite materials can be added directly to the core, e.g., by spraying or coating a solution comprising the expandable graphite material, or can be added by coupling a skin, additional prepreg or core or other component comprising expandable graphite materials to the core. For example, a first core and a second core disposed on the first core can provide a composite article. Each of the cores may comprise a substantially uniform distribution of expandable graphite materials, but the amount and/or type of expandable graphite materials in the two cores can be different, e.g., the loading rates can be different or the materials themselves may be different. If desired, however, only one of the cores may comprise expandable graphite material and the other core may not comprise a lofting agent or may comprise a lofting agent other than expandable graphite material, e.g., microspheres. The microspheres may be present in combination with the expandable graphite material or may be present in one of the cores without any expandable graphite material. The thermoplastic materials of the cores can be melted to provide a single combined core including materials from the two cores. The result of melting of the cores is a composite core with a gradient distribution of expandable graphite materials. In other configurations, a distribution of expandable graphite materials in a core can be provided by coupling a skin or other material comprising expandable graphite materials to the core. In other instances, the skin can be melted into the core to couple the skin and the core to leave a coupled skin/core composite material without any substantial interface. If desired and as described in more detail below, an additional skin, which may or may not comprise expandable graphite materials can also be coupled to the core on an opposite side from the first skin.

In certain configurations, the thermoplastic material of the core may be used to provide a core in fiber form, particle form, resin form or other suitable forms. In some examples, the thermoplastic material used in the core can be present in particle form and have an average particle size that is substantially the same as the average particle size of the expandable graphite materials. By matching the particles sizes of the thermoplastic material and the expandable graphite materials, enhanced processing of the cores including, for example, increased retention of the expandable graphite materials in the core, an increase in reserved loft capacity, etc. can be achieved. In some instances, the average particle size of the expandable graphite materials and the average particle size of the thermoplastic material can vary by about 5% to about 10% and enhanced processing can still be achieved. In certain configurations, the average particle size of each of the thermoplastic material and the expandable graphite materials in the core can range from about 50 microns to about 900 microns. In other instances, expandable graphite materials with an average particle size about the same as the average particle size of the thermoplastic material can be present along with expandable graphite materials of an average particle size that is different than the average particle size of the thermoplastic material. Even though the average particle size of the expandable graphite materials may differ, the chemical composition of the expandable graphite materials can be the same or can be different. In yet other configurations, two or more thermoplastic materials with different average particle sizes can be present. If desired, two expandable graphite materials with average particle sizes that are substantially the same as the average particle sizes of the two thermoplastic materials can be present in the core. The two expandable graphite materials may be chemically the same or may be chemically distinct. Similarly, the thermoplastic materials can be chemically the same (but have a different average particle size) or can be chemically distinct.

In certain embodiments, the core generally comprises a substantial amount of open cell structure such that void space is present in the core. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 5-30%, 5-40%, 5-50%, 5-60%, 5-70%, 5-80%, 5-90%, 5-95%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core comprises a porosity or void content of greater than 0%, e.g., is not fully consolidated, up to about 95%. Unless otherwise stated, the reference to the core comprising a certain void content or porosity is based on the total volume of the core and not necessarily the total volume of the core plus any other materials or layers coupled to the core. Compared to a prepreg, the porosity of the core can be the same or can be different. For example, in many instances, a prepreg is formed into a core by passing a prepreg through a set of rollers or by pressing one surfaces of the prepreg. In such instances, the porosity of the core may be different than the porosity of the prepreg, e.g., can be lower. In some instances, the porosity of the core is intentionally selected to be less than a comparable prepreg to provide for increased lofting of the core into a final formed article or product.

In certain embodiments, the high porosity present in the core permits trapping of expandable graphite materials within the pores of the core. For example, expandable graphite materials can reside in the void space in a non-covalently bonded manner. Application of heat or other perturbations can act to increase the volume of the non-covalently bonded expandable graphite materials which in turn increases the overall thickness of the core, e.g., the thickness increases as the size of the expandable graphite material increases, the separation distance between molecular layers of the graphite material increases and/or additional air becomes trapped in the core. For example, the expandable graphite materials can be operative as a lofting agent such that application of a suitable stimulus, e.g., radiant heat, functions to increase the overall thickness of the core. As noted herein, such stimuli can increase core thickness by increasing a separation distance between layers of the expandable graphite material and/or by trapping air within the post-lofted core structure. In some instances, the expandable graphite material in the core is effective to function as a step-wise lofting agent as noted in connection with FIG. 1B and the prepreg description herein. As demonstrated in the examples appended hereto, a core comprising expandable graphite material can provide for enhanced lofting capacity due to the core being generally insensitive (compared to microspheres) to lower convection heating temperatures. For example, a prepreg comprising expandable graphite material can be processed into a core without substantial expansion of the expandable graphite material. The reserve lofting capacity permits an end user to process the core further to provide an article or component of a desired thickness and/or configuration. In contrast, a prepreg comprising microspheres that is processed into a core typically does suffer some expansion (and potential collapse of the microspheres) during processing into a core. This expansion reduces the remaining expansion that is available and may limit the overall thickness achievable in the final formed article.

In certain embodiments, the thermoplastic material of the cores described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the core can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the core can vary and illustrative amounts range from about 20% by weight to about 80% by weight.

In certain examples, the fibers of the cores described herein can comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the expandable graphite materials or both. In some instances, the fibers used in the core can first be reacted with the expandable graphite material to provide a derivatized fiber that is then mixed with the thermoplastic material. Alternatively, the expandable graphite material can be reacted with the thermoplastic material of the core to provide a derivatized thermoplastic material that is then mixed with the fibers. The fiber content in the core may be from about 20% to about 90% by weight of the core, more particularly from about 30% to about 70%, by weight of the core. The particular size and/or orientation of the fibers used may depend, at least in part, on the polymer material used and/or the desired properties of the resulting core. Suitable additional types of fibers, fiber sizes and amounts will be readily selected by the person of ordinary skill in the art, given the benefit of this disclosure. In one non-limiting illustration, fibers dispersed within a thermoplastic material and expandable graphite material to provide a core generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In certain examples, the expandable graphite materials of the cores described herein comprises one or more graphene based materials. In addition to providing lofting capabilities, the expandable graphite materials can also provide some degree of flame retardancy to the core and/or any article including the core. In some embodiments, enough expandable graphite material is present, e.g., a flame retardant amount of expandable graphite materials is present, in the core such that the core meets the Federal Motor Vehicle Safety Standard 302 (FMVSS 302) flammability test dated 1991, which is generally equivalent to ISO 3795 dated 1989 and ASTM D5132 dated 2004. Such flame retardant amounts can permit construction of a core that is substantially free of external or added flame retardant agents. The size of the expandable graphite material can be selected such that a flame retardant amount of the expandable graphite material is retained during processing to form the core. For example, where microspheres are used as a lofting agent, a substantial amount, e.g., 30% or more, of the microspheres are often removed during processing to form the core. This removal reduces potential lofting capacity. Where an expandable graphite material of appropriate size, e.g., an expandable graphite material with an average particle size of about 300 microns or greater is used, enhanced retention of the expandable graphite material in the core can be achieved. The exact type of expandable graphite materials used in the core can depend on numerous factors including, for example, the desired lofting temperature, the desired degree of flame retardancy, the desired basis weight and other factors. Illustrative commercially available expandable graphite materials that can be present in a core are commercially available from Nyacol Nano Technologies, Inc. (Ashland, Mass.) and include, for example, grades 35, 200, 249, 250, 251, KP251 and 351 expandable graphite materials. Additional expandable graphite material can be purchased commercially from Graftech International (Lakewood, Ohio). The expandable graphite material materials present in the core are generally present as stacked molecular layers. Heating of the expandable graphite material in the thermoplastic cores described herein can result in increased separation between layers and a resulting increase in thickness of the core. The expandable graphite material can be present in many forms including flake form, particle form or other forms. In some instances, the expandable graphite material in a core is present in flake or particle form and may comprise an average particle size of at least 300 microns, for example, or may comprise an average particle size that is substantially similar to the average particle size of thermoplastic material in the core.

In some instances, the core may be a substantially halogen free or halogen free core to meet the restrictions on hazardous substances requirements for certain applications. In other instances, the core may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the core), more particularly about 1 weight percent to about 13 weight percent, e.g., about 5 weight percent to about 13 weight percent. If desired, two different halogenated flame retardants may be added to the core. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the cores may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the core), more particularly about 1 weight percent to about 13 weight percent, e.g., about 5 weight percent to about 13 weight percent based on the weight of the cores. If desired, two different substantially halogen free flame retardants may be added to the cores. In certain instances, the cores described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the core), more particularly about 1 weight percent to about 15 weight percent, e.g., about 2 weight percent to about 14 weight percent based on the weight of the core. The flame retardant agents used in the cores described herein can be added to the mixture comprising the expandable graphite material, thermoplastic material and fibers (prior to disposal of the mixture on a wire screen or other processing component) or can be added after the core is cured, e.g., by soaking the core in the flame retardant agent or spraying flame retardant agent on the core.

Figure 3:
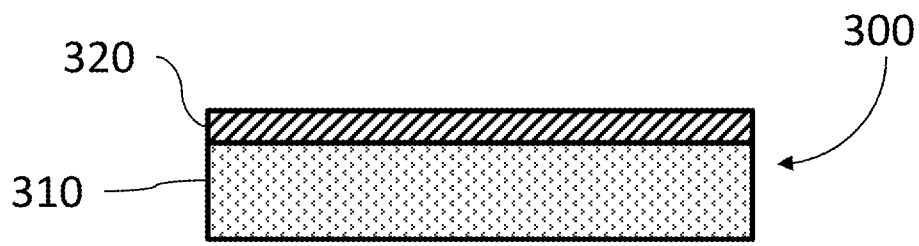
FIG. 3 is an illustration of an article comprising a prepreg (or core) and a skin disposed on the prepreg (or core), in accordance with certain examples.

In certain embodiments, the prepregs or cores described herein may comprise one or more skins disposed on a surface of the prepreg or core to provide an article. Referring to FIG. 3, an article 300 comprises a prepreg or core 310 that comprises a thermoplastic material, a plurality of fibers and expandable graphite materials disposed in the void space of the prepreg or core. The article 300 comprises a first skin 320 disposed on the prepreg or core 310. The skin 320 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 310. In other instances, the skin 320 may comprise a limiting oxygen index greater than about 22, as measured per ISO 4589 dated 1996. Where a thermoplastic film is present as (or as part of) the skin 320, the thermoplastic film may comprise at least one of poly (ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 320, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the skin 320, the coating may comprise at least one of unsaturated polyurethanes, vinyl esters, phenolics and epoxies. Where an inorganic coating is present as (or as part of) the skin 320, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 320, the non-woven fabric may comprise a thermoplastic material, a thermal setting binder, inorganic fibers, metal fibers, metallized inorganic fibers and metallized synthetic fibers. The prepreg or core 310 may comprise any of the materials described herein in connection with prepregs and cores, e.g., a thermoplastic material, reinforcing fibers and expandable graphite material dispersed in the prepreg or core 310, e.g., expandable graphite material dispersed in a substantially uniform distribution from one surface to another surface of the prepreg or core 310. If desired, the skin 320 may comprise an expandable graphite material as well.

Figure 4:
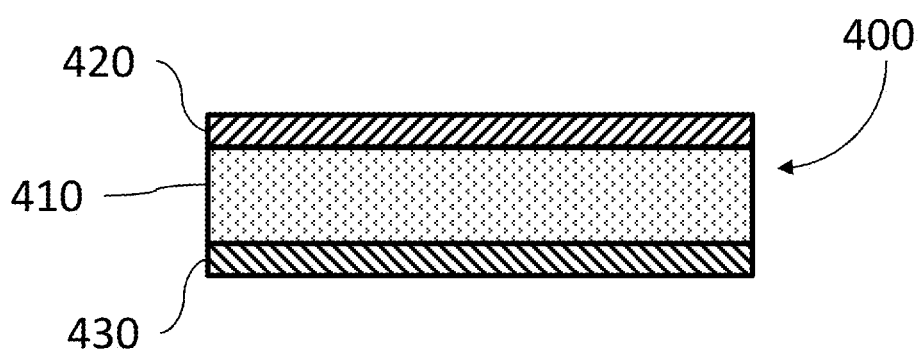
FIG. 4 is an illustration of an article comprising a prepreg (or core) and a skin disposed on each side of the prepreg (or core), in accordance with certain configurations.

In certain configurations, the prepregs and cores described herein can be used to provide an article comprising a skin on each side of the prepreg or core. Referring to FIG. 4, an article 400 is shown comprising a prepreg or core 410, a first skin 420 disposed on a first surface of the prepreg or core 410 and a second skin 430 disposed on the prepreg or core 410. The prepreg or core 410 may comprise any of the materials described herein in connection with prepregs and cores, e.g., a thermoplastic material, reinforcing fibers and expandable graphite material dispersed in the prepreg or core 410, e.g., expandable graphite material dispersed in a substantially uniform distribution from one surface to another surface of the prepreg or core 410. Each of the first skin 420 and the second skin 430 can be independently selected from a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 410. In other instances, the skin 420 or the skin 430 (or both) may comprise a limiting oxygen index greater than about 22, as measured per ISO 4589 dated 1996. Where a thermoplastic film is present as (or as part of) the skin 420 or the skin 430 (or both), the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 420 or the skin 430 (or both), the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the skin 420 or the skin 430 (or both), the coating may comprise at least one of unsaturated polyurethanes, vinyl esters, phenolics and epoxies. Where an inorganic coating is present as (or as part of) the skin 420 or the skin 430 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 420 or the skin 430 (or both), the non-woven fabric may comprise a thermoplastic material, a thermal setting binder, inorganic fibers, metal fibers, metallized inorganic fibers and metallized synthetic fibers. If desired, one or both of the skins 420, 430 may comprise an expandable graphite material as well.

Figure 5:
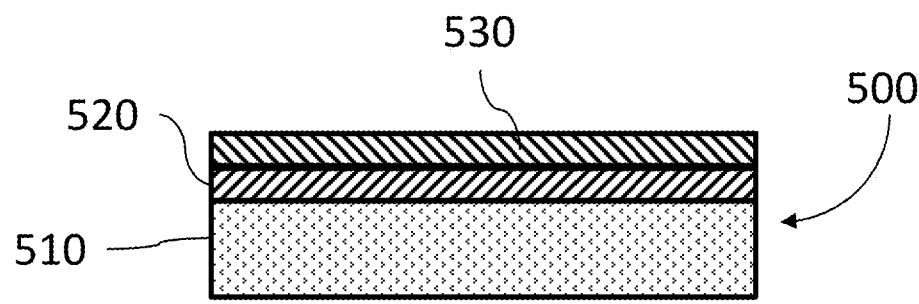
FIG. 5 is an illustration of an article comprising a prepreg (or core), a skin disposed on the prepreg (or core) and a decorative layer disposed on the skin, in accordance with certain examples.

In certain instances, an article can comprise a prepreg or core, at least one skin disposed on the prepreg or core and a decorative or cover layer disposed on the skin. Referring to FIG. 5, an article 500 is shown comprising a prepreg or core 510, a skin 520 disposed on a first surface of the prepreg or core 510 and a decorative layer 530 disposed on the skin 520. The prepreg or core 510 may comprise any of the materials described herein in connection with prepregs and cores, e.g., a thermoplastic material, reinforcing fibers and expandable graphite material dispersed in the prepreg or core 510, e.g., expandable graphite material dispersed in a substantially uniform distribution from one surface to another surface of the prepreg or core 510. The skin 520 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 510. In other instances, the skin 520 may comprise a limiting oxygen index greater than about 22, as measured per ISO 4589 dated 1996. Where a thermoplastic film is present, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present, the coating may comprise at least one of unsaturated polyurethanes, vinyl esters, phenolics and epoxies. Where an inorganic coating is present, the inorganic coating may comprise minerals containing cations selected from Ca, Mg, Ba, Si, Zn, Ti and Al or may comprise at least one of gypsum, calcium carbonate and mortar. Where a non-woven fabric is present, the non-woven fabric may comprise a thermoplastic material, a thermal setting binder, inorganic fibers, metal fibers, metallized inorganic fibers and metallized synthetic fibers. The decorative layer 530 may be formed, e.g., from a thermoplastic film of polyvinyl chloride, polyolefins, thermoplastic polyesters, thermoplastic elastomers, or the like. The decorative layer 530 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 530 may also be produced using spunbond, thermal bonded, spun lace, melt-blown, wet-laid, and/or dry-laid processes.

Figure 6:
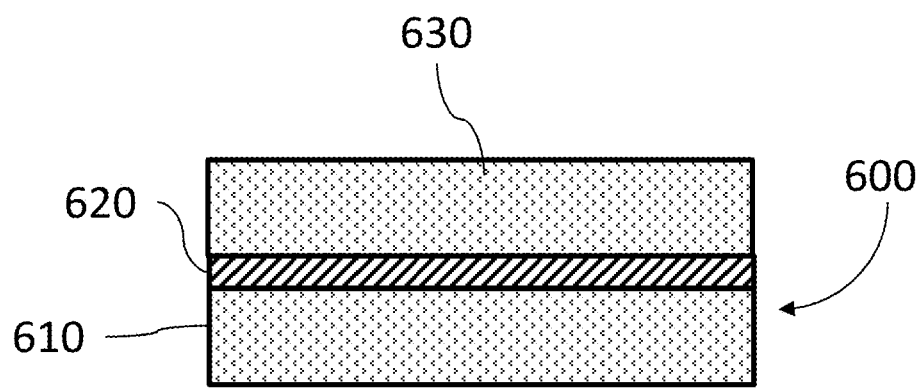
FIG. 6 is an illustration of an article comprising two prepregs or cores coupled to each other through an intermediate layer, in accordance with certain examples.

In certain configurations, two or more prepregs or cores can be coupled to each other through an intervening or intermediate layer such as, for example, a skin. Referring to FIG. 6, an article 600 comprising a prepreg or core 610 coupled to a prepreg or core 630 through an intermediate layer 620 is shown. Each of the prepregs or cores 610, 630 may be the same or may be different. In some instances, the thermoplastic materials and fibers of the prepregs or cores 610, 630 are the same, but the expandable graphite material loading or type of expandable graphite material present in the prepregs or cores 610, 630 is different. In other instances, the type and/or amount of expandable graphite material in the prepregs or cores 610, 630 may be the same and one or both of the thermoplastic material and/or the fibers may be different, e.g., may be chemically different or may be present in differ amounts. In some instances, covalently bonded expandable graphite material may be present in one or more both of the prepregs or cores 610, 630. In other instances, non-covalently bonded expandable graphite material may be present in one or both of the prepregs or cores 610, 630. If desired, one or more suitable flame retardant agents, e.g., halogenated or non-halogenated flame retardant agents may be present in one or both of the cores 610, 630. While the thickness of the prepregs or cores 610, 630 is shown as being about the same in FIG. 6, the thickness of the prepregs or cores 610, 630 can vary. In some configurations, one of the prepregs or cores 610, 630 may comprise a lofting agent other than expandable graphite material, e.g., microspheres. The microspheres may be present in combination with the expandable graphite material or may be present in one of the prepregs or cores 610, 630 without any expandable graphite material. The intermediate layer 620 may take the form of a skin as described herein. For example, the intermediate layer 620 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 610. In other instances, the layer 620 may comprise a limiting oxygen index greater than about 22, as measured per ISO 4589 dated 1996. Where a thermoplastic film is present, the thermoplastic film may comprise at least one of poly(ether imide), poly(ether ketone), poly(ether-ether ketone), poly (phenylene sulfide), poly(arylene sulfone), poly(ether sulfone), poly(amide-imide), poly(1,4-phenylene), polycarbonate, nylon, and silicone. Where a fiber based scrim is present as or in the layer 620, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the layer 620, the coating may comprise at least one of unsaturated polyurethanes, vinyl esters, phenolics and epoxies. Where an inorganic coating is present as or in the layer 620, the inorganic coating may comprise minerals containing cations selected from Ca, Mg, Ba, Si, Zn, Ti and Al or may comprise at least one of gypsum, calcium carbonate and mortar. Where a non-woven fabric is present as or in the layer 620, the non-woven fabric may comprise a thermoplastic material, a thermal setting binder, inorganic fibers, metal fibers, metallized inorganic fibers and metallized synthetic fibers. While not shown, a decorative layer can be coupled to either (or both) of the prepregs or cores 610, 630. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 7:
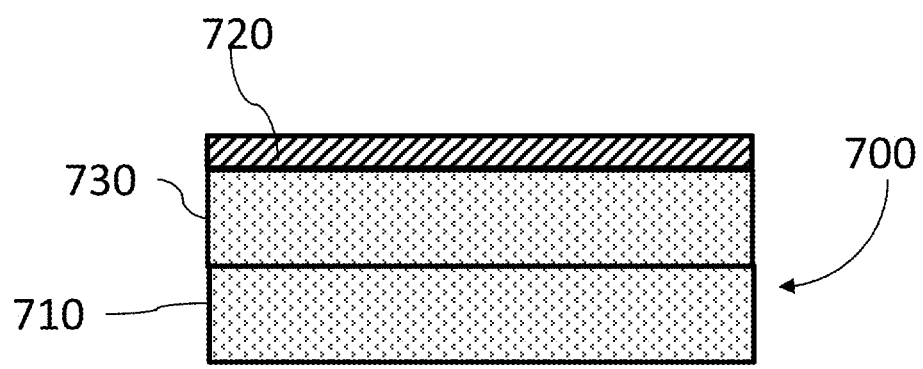
FIG. 7 is an illustration of an article comprising two prepregs or cores and a skin disposed on one of the prepregs or cores, in accordance with certain configurations.

In certain embodiments, two or more prepregs or cores can be coupled to each other and then a skin may be disposed on one surface of the prepregs or cores. Referring to FIG. 7, an article 700 comprising a prepreg or core 710 coupled to a prepreg or core 730 and a skin 720 disposed on the core 730 is shown. Each of the prepregs or cores 710, 720 may be the same or may be different. In some instances, the thermoplastic materials and fibers of the cores 710, 730 are the same, but the expandable graphite material loading or type of expandable graphite material present in the cores 710, 730 is different. In other instances, the type and/or amount of expandable graphite material in the cores 710, 730 may be the same and one or both of the thermoplastic material and/or the fibers may be different, e.g., may be chemically different or may be present in differ amounts. In some instances, covalently bonded expandable graphite material may be present in one or more both of the prepregs or cores 710, 730. In other instances, non-covalently bonded expandable graphite material may be present in one or both of the prepregs or cores 710, 720. If desired, one or more suitable flame retardant agents, e.g., halogenated or non-halogenated flame retardant agents may be present in one or both of the prepregs or cores 710, 730. While the thickness of the prepregs or cores 710, 730 is shown as being about the same in FIG. 7, the thickness of the prepregs or cores 710, 730 can vary. In some configurations, one of the prepregs or cores 710, 730 may comprise a lofting agent other than expandable graphite material, e.g., microspheres. The microspheres may be present in combination with the expandable graphite material or may be present in one of the prepregs or cores 710, 730 without any expandable graphite material. The skin 720 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 730. In other instances, the skin 720 may comprise a limiting oxygen index greater than about 22, as measured per ISO 4589 dated 1996. Where a thermoplastic film is present as or in the skin 720, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as or in the skin 720, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the skin 720, the coating may comprise at least one of unsaturated polyurethanes, vinyl esters, phenolics and epoxies. Where an inorganic coating is present as or in the skin 720, the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 720, the non-woven fabric may comprise a thermoplastic material, a thermal setting binder, inorganic fibers, metal fibers, metallized inorganic fibers and metallized synthetic fibers. While not shown, a decorative layer can be coupled to the skin 720 or to a surface of the prepreg or core 710. As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 8:
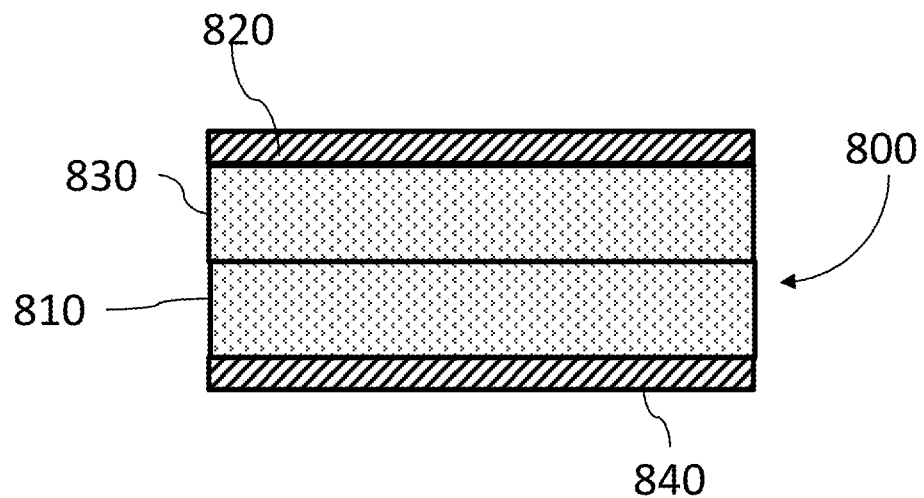
FIG. 8 is an illustration of an article comprising two prepregs or cores and a skin disposed on each of the prepregs or cores, in accordance with certain configurations.

In certain embodiments, two or more prepregs or cores can be coupled to each other and then a skin may be disposed on each surface of the prepregs or cores. Referring to FIG. 8, an article 800 comprising a prepreg or core 810 coupled to a prepreg or core 830, a first skin 820 disposed on the core 830, and a second skin 840 disposed on the core 810 is shown. Each of the prepregs or cores 810, 830 may be the same or may be different. In some instances, the thermoplastic materials and fibers of the prepregs or cores 810, 830 are the same, but the expandable graphite material loading or type of expandable graphite material present in the prepregs or cores 810, 830 is different. In other instances, the type and/or amount of expandable graphite material in the prepregs or cores 810, 830 may be the same and one or both of the thermoplastic material and/or the fibers may be different, e.g., may be chemically different or may be present in differ amounts. In some instances, covalently bonded expandable graphite material may be present in one or more both of the prepregs or cores 810, 830. In other instances, non-covalently bonded expandable graphite material may be present in one or both of the prepregs or cores 810, 830. If desired, one or more suitable flame retardant agents, e.g., halogenated or non-halogenated flame retardant agents may be present in one or both of the prepregs or cores 810, 830. While the thickness of the prepregs or cores 810, 830 is shown as being about the same in FIG. 8, the thickness of the prepregs or cores 810, 830 can vary. In some configurations, one of the prepregs or cores 810, 830 may comprise a lofting agent other than expandable graphite material, e.g., microspheres. The microspheres may be present in combination with the expandable graphite material or may be present in one of the cores 810, 830 without any expandable graphite material. Each of the skins 820, 840 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 830. In other instances, the skins 820, 840 may independently comprise a limiting oxygen index greater than about 22, as measured per ISO 4589 dated 1996. Where a thermoplastic film is present as or in the skin 820 or the skin 840 (or both), the thermoplastic film may comprise at least one of poly(ether imide), poly (ether ketone), poly(ether-ether ketone), poly(phenylene sulfide), poly(arylene sulfone), poly(ether sulfone), poly (amide-imide), poly(1,4-phenylene), polycarbonate, nylon, and silicone. Where a fiber based scrim is present as or in the skin 820 or the skin 840 (or both), the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the skin 820 or the skin 840 (or both), the coating may comprise at least one of unsaturated polyurethanes, vinyl esters, phenolics and epoxies. Where an inorganic coating is present as or in the skin 820 or the skin 840 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as or in the skin 820 or the skin 840 (or both), the non-woven fabric may comprise a thermoplastic material, a thermal setting binder, inorganic fibers, metal fibers, metallized inorganic fibers and metallized synthetic fibers. While not shown, a decorative layer can be coupled to the skin 820 or to the skin 840 (or both). As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 9:
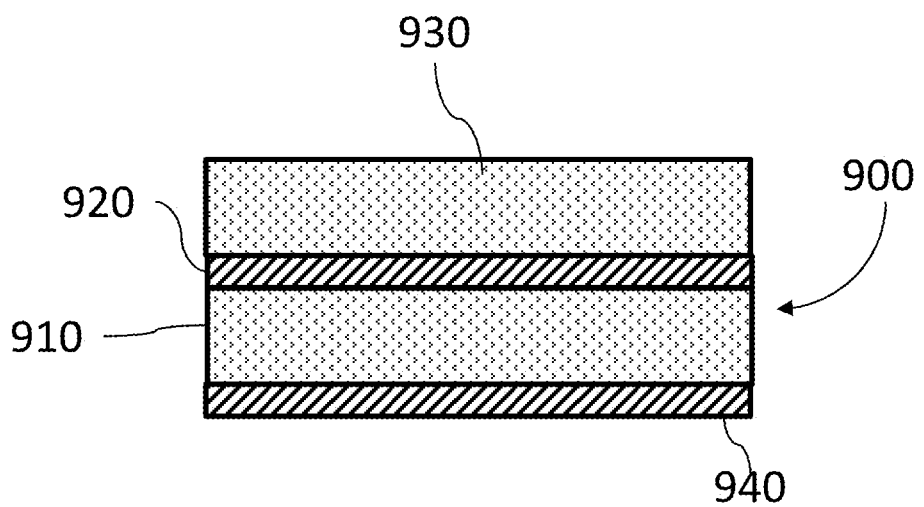
FIG. 9 is an illustration of an article comprising two prepregs or cores coupled to each other through an intermediate layer and a skin disposed on one of the prepregs or core, in accordance with certain examples.

In certain embodiments, two or more prepregs or cores can be coupled to each other and then a skin may be disposed on each surface of the prepregs or cores. Referring to FIG. 9, an article 900 comprising a prepreg or core 910 coupled to a prepreg or core 930 through an intermediate layer 920, and a skin 840 disposed on the core 940 is shown. If desired, the skin 940 can instead be disposed on the prepreg or core 930 or another skin (not shown) can be disposed on the prepreg or core 920. Each of the prepregs or cores 910, 930 may be the same or may be different. In some instances, the thermoplastic materials and fibers of the prepregs or cores 910, 930 are the same, but the expandable graphite material loading or type of expandable graphite material present in the prepregs or cores 910, 930 is different. In other instances, the type and/or amount of expandable graphite material in the prepregs or cores 910, 930 may be the same and one or both of the thermoplastic material and/or the fibers may be different, e.g., may be chemically different or may be present in differ amounts. In some instances, covalently bonded expandable graphite material may be present in one or more both of the prepregs or cores 910, 930. In other instances, non-covalently bonded expandable graphite material may be present in one or both of the prepregs or cores 910, 930. If desired, one or more suitable flame retardant agents, e.g., halogenated or non-halogenated flame retardant agents may be present in one or both of the prepregs or cores 910, 930. While the thickness of the prepregs or cores 910, 930 is shown as being about the same in FIG. 9, the thickness of the prepregs or cores 910, 930 can vary. In some configurations, one of the prepregs or cores 910, 930 may comprise a lofting agent other than expandable graphite material, e.g., microspheres. The microspheres may be present in combination with the expandable graphite material or may be present in one of the cores 910, 930 without any expandable graphite material. The layer 920 and the skin 940 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 830. In other instances, the layer 920 and the skin 940 may independently comprise a limiting oxygen index greater than about 22, as measured per ISO 4589 dated 1996. Where a thermoplastic film is present as or in the layer 920 or the skin 940 (or both), the thermoplastic film may comprise at least one of poly(ether imide), poly(ether ketone), poly(ether-ether ketone), poly (phenylene sulfide), poly(arylene sulfone), poly(ether sulfone), poly(amide-imide), poly(1,4-phenylene), polycarbonate, nylon, and silicone. Where a fiber based scrim is present as or in the layer 920 or the skin 940 (or both), the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as or in the layer 920 or the skin 940 (or both), the coating may comprise at least one of unsaturated polyurethanes, vinyl esters, phenolics and epoxies. Where an inorganic coating is present as or in the layer 920 or the skin 940 (or both), the inorganic coating may comprise minerals containing cations selected from Ca, Mg, Ba, Si, Zn, Ti and Al or may comprise at least one of gypsum, calcium carbonate and mortar. Where a non-woven fabric is present as or in the layer 920 or the skin 940 (or both), the non-woven fabric may comprise a thermoplastic material, a thermal setting binder, inorganic fibers, metal fibers, metallized inorganic fibers and metallized synthetic fibers. While not shown, a decorative layer can be coupled to the skin 920 or the prepreg or core 930 (or both). As noted herein, the decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes.

Figure 10:
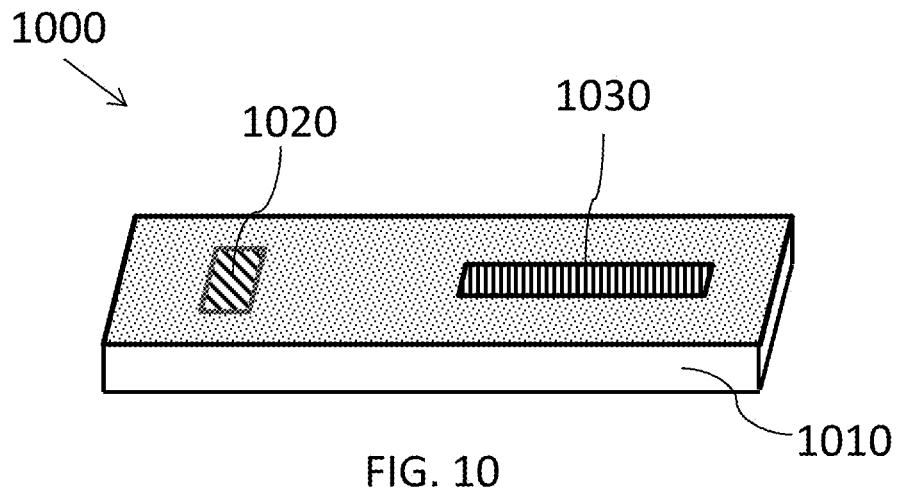
FIG. 10 is an illustration of strips of material disposed on a prepreg or core, in accordance with certain embodiments.

In certain embodiments, strips of materials can be disposed on a prepreg or core layer. Referring to FIG. 10, an article 1000 comprising a prepreg or core 1010 with strips 1020, 1030 disposed on different areas of the prepreg or core 1010 is shown. If desired, such strips can be present on any of the illustrative embodiments shown in FIGS. 1A and 2A-9. The strips 1020, 1030 may be the same or may be different. In some instances, the strips 1020, 1030 may comprise expandable graphite material as noted herein. For example, the strips may comprise expandable graphite material that is non-covalently bonded to other materials in the strips or may comprise expandable graphite material that is covalently bonded to other materials in the strips. In some instances, the strips 1020, 1030 may independently take the form of a prepreg or core as described herein. In other configurations, the strips may take the form of a skin or layer as described herein. In certain instances, the strips can be disposed, for example, on areas of the article 100 where it may be desirable to provide structural reinforcement or on areas where a differential thickness is desired. In the case where the strips 1020, 1030 comprise a lofting agent such as microspheres or expandable graphite material, additional thickness at areas comprising the strips 1020, 1030 can be achieved if desired.

In some embodiments, the prepregs and cores may include additional materials or additives to impart desired physical or chemical properties. For example, one or more dyes, texturizing agents, colorants, viscosity modifiers, smoke suppressants, synergistic materials, lofting agents, particles, powders, biocidal agents, foams or other materials can be mixed with or added to the prepregs or the cores. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. For example, a synergist that enhances the flame retardant nature of the expandable graphite material may be present. If desired, a synergist material that enhances lofting ability may be present. Illustrative synergist materials include, but are not limited to, sodium trichlorobenzene sulfonate potassium, diphenyl sulfone-3-sulfonate, and mixtures thereof.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein can be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® mat. SUPERLITE® mat loaded with expandable graphite materials can provide desirable attributed including, for example, flame retardancy and enhanced processing capabilities. The areal density of such a GMT or LWRT can range from about 400 grams per square meter (gsm) of the GMT or LWRT to about 4000 gsm, although the areal density may be less than 400 gsm or greater than 4000 gsm depending on the specific application needs. In some embodiments, the upper density can be less than about 4000 gsm. In certain instances, the GMT or the LWRT may comprise expandable graphite materials disposed in void space of the GMT or the LWRT. For example, non-covalently bonded expandable graphite materials can be present in void space of the GMT or the LWRT. In other instances, covalently-bonded expandable graphite materials can be present in void space of the GMT or the LWRT. In yet other configurations, both non-covalently bonded expandable graphite materials and covalently bonded expandable graphite materials can be present in the GMT or the LWRT. Where a GMT or LWRT prepreg or core is used in combination with expandable graphite materials, the basis weight of the GMT or LWRT can be reduced to less than 800 gsm, 600 gsm or 400 gsm, for example, while still providing suitable performance properties. If desired, an additional lofting agent, e.g., microspheres can be present in the GMT or LWRT.

In producing the prepregs and cores described herein, it may be desirable to use a wet-laid process. For example, a liquid or fluid medium comprising dispersed material, e.g., thermoplastic materials, fibers and expandable graphite material optionally with any one or more additives described herein (e.g., other lofting agents or flame retardant agents), may be stirred or agitated in the presence of a gas, e.g., air or other gas. The dispersion may then be laid onto a support, e.g., a wire screen or other support material, to provide a substantially uniform distribution of expandable graphite material in the laid down material. To increase expandable graphite material dispersion and/or uniformity, the stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, expandable graphite material and any other materials that are present, e.g., fibers, additives, etc. As noted herein, by selecting the expandable graphite material particle size to be substantially the same as or greater than an average particle size of the thermoplastic material, enhanced retention of the expandable graphite material (compared to the level of microsphere retention) can be achieved. The resulting web can be dried, consolidated, pressed, lofted, laminated, sized or otherwise processed further to provide a desired prepreg, core or article. In some instances, an additive or additional expandable graphite material can be added to the web prior to drying, consolidation, pressing, lofting, laminating, sizing or other further processing to provide a desired prepreg, core or article. In other instances, the expandable graphite material may be added to the web subsequent to drying, consolidation, pressing, lofting, laminating, sizing or other further processing to provide a desired prepreg, core or article. While wet laid processes may be used, depending on the nature of the thermoplastic material, the expandable graphite material and other materials present, it may be desirable to instead use an air laid process, a dry blend process, a carding and needle process, or other known process that are employed for making non-woven products. In some instances, additional expandable graphite material can be sprayed onto the surface of the prepreg or core after the prepreg or core has hardened to some degree by passing the board underneath a plurality of coating jets that are configured to spray the expandable graphite material at about a ninety degree angle to the prepreg or core surface.

In some configurations, the prepregs and cores described herein can be produced by combining a thermoplastic material, fibers, expandable graphite material in the presence of a surfactant in an aqueous solution or foam. The combined components can be mixed or agitated for a sufficient time to disperse the various materials and provide a substantially homogeneous aqueous mixture of the materials. The dispersed mixture is then laid down on any suitable support structure, for example, a wire mesh or other mesh or support having a desired porosity. Water can then be evacuated through the wire mesh forming a web. The web is dried and heated above the softening temperature of the thermoplastic powder. The web is then cooled and pressed to a predetermined thickness to produce a composite sheet having a void content of between about 1 percent to about 95 percent. In an alternate embodiment, the aqueous foam also includes a binder material.

In certain examples, a prepreg or core in the form of a GMT can be produced. In certain instances, the GMT can be generally prepared using chopped glass fibers, a thermoplastic material, expandable graphite materials and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the high melt flow index resin. To produce the glass mat, a thermoplastic material, reinforcing materials, expandable graphite materials and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the expandable graphite materials. In some examples, the dispersed mixture of glass and resin can be pumped to a head-box located above a wire section of a paper machine via a distribution manifold. The foam, not the glass fiber, expandable graphite materials or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, a film may be laminated onto the web by passing the web of glass fiber, expandable graphite materials, thermoplastic material and film through the nip of a set of heated rollers. If desired, additional layers such as, for example, a non-woven and/or woven fabric layer may also be attached along with the film to one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In certain embodiments, the presence of EG materials in combination with a thermoplastic material and reinforcing fibers permits better control of loft than can be accomplished with conventional liquid hydrocarbon-polymer shell microspheres. For example, by selecting EG materials which are substantially insensitive to convection heating and sensitive to other types of heating, e.g., IR heating, prepregs, cores and articles can be produced with high reserve lofting capacity. This configuration permits an end user to have a wider range of possible final thicknesses for parts that include the prepregs, cores and articles. For example, the end user can select desirable heating conditions to process the part to provide a desired resulting thickness. If desired, different areas of the part may have a different final thickness by altering the applied processing conditions to certain areas.

In some instances, a prepreg, core or article can be produced by combining a thermoplastic material, reinforcing fibers and expandable graphite particles in a mixture to form an agitated aqueous foam. The agitated aqueous foam can be disposed onto a wire support. Water can be evacuated to form a web or open cell structure. The web can be heated, e.g., using convection heating, above the melting temperature of the thermoplastic material under conditions such that substantially no loft occurs, which step is also referred to as consolidation in some instances. If desired, pressure can be applied to the web to provide a thermoplastic composite sheet comprising the expandable graphite particles, e.g., comprising EG material homogeneously dispersed in the web (or open cell structure) or non-homogeneously dispersed in the web (or open cell structure). The sheet can be further processed by selecting suitable heating conditions to provide a desired loft. In some instances, heating conditions that are effective to loft the sheet can be applied to increase the overall board thickness. For example, a skin, cover layer or other material can be placed on the sheet. The multi-layer assembly can be placed in a mold and heating conditions can be applied to loft the sheet to press the surfaces of the sheet against the other layers of the assembly. By increasing the overall thickness of the sheet, better adhesion between the sheet and the other layers of the assembly can be achieved.

In certain instances, a method of producing a composite article comprises combining a thermoplastic material, reinforcing fibers and expandable graphite particles in a mixture to form an agitated aqueous foam. The foam is disposed onto a wire support, and the water is evacuated to form a web or open cell structure comprising the thermoplastic material, fibers and graphite materials. In some instances, the web is then heated to a first temperature above the melting temperature of the thermoplastic material, in which the first temperature is below a loft onset temperature of the expandable graphite particles so substantially no loft occurs. In other instances, the web can be heating using heating conditions that melt the thermoplastic material, e.g., convection heating, but do not substantially loft the expandable graphite particles. If desired, pressure can then be applied to the web, e.g., using nip rollers or other devices, to provide a thermoplastic composite sheet comprising the expandable graphite particles dispersed in the web.

Certain examples are described below to illustrate better some of the novel aspects and configurations described herein.

Example 1

Different compositions were produced using polypropylene resin and glass fibers. One composition (H1100) comprising liquid hydrocarbon core-polymer microspheres present at 5 weight percent. A second composition comprised EG-249C expandable graphite (EG) materials present at 5 weight percent. A third composition comprised EG-249C expandable graphite materials present at 10 weight percent. A fourth composition comprised EG-249C expandable graphite materials present at 15 weight percent. A fifth composition comprised EG-HV expandable graphite materials present at 10 weight percent. About 60 weight percent polypropylene and 40 weight percent glass fibers were present in each composition. The weight percent of EG in each composition was based on the total weight of the polypropylene and glass fibers, e.g., a composition with 5 weight percent EG can be produced by adding 5 g of EG to a composition comprising 40 g of glass fibers and 60 grams of polypropylene. Each of the compositions was made into a sheet having a basis weight of about 800 gsm.

Figure 11:
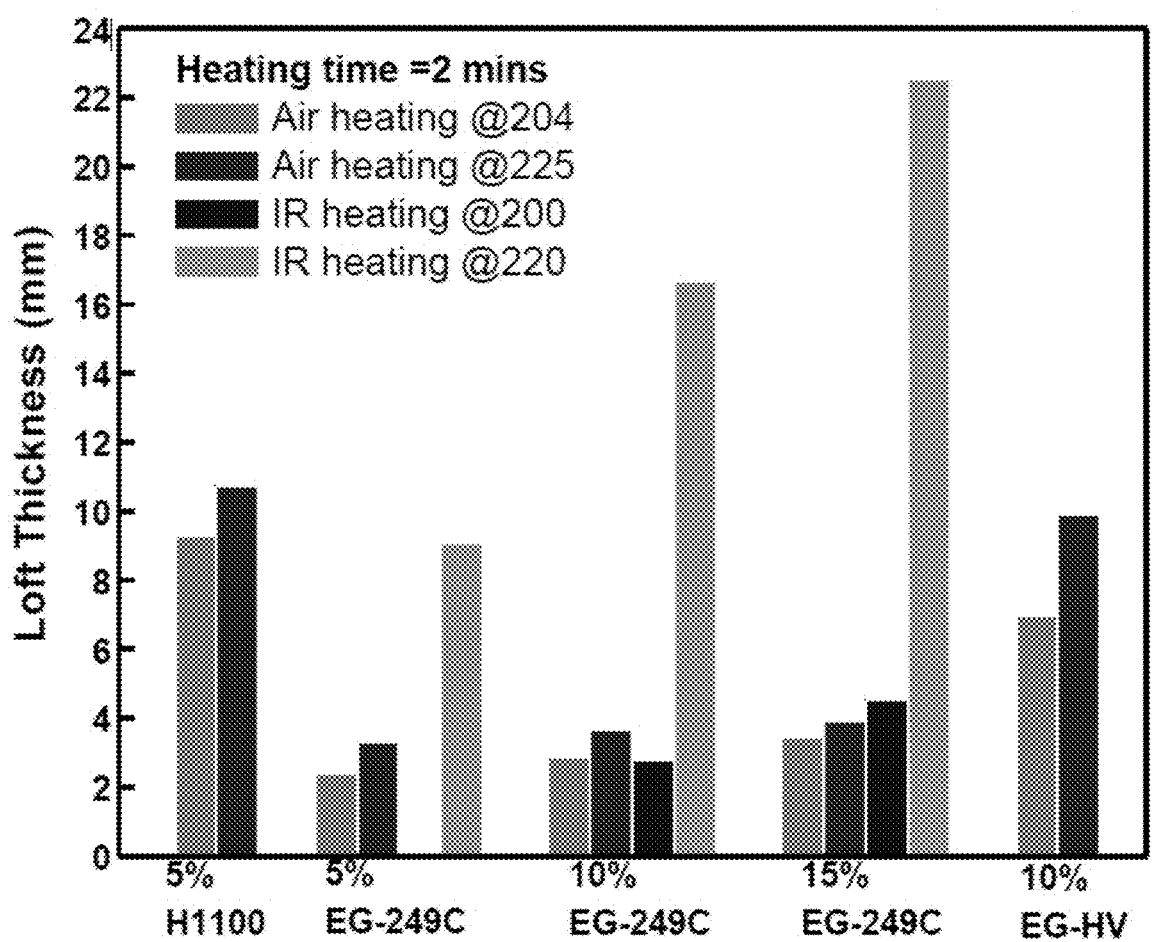
FIG. 11 is bar graph showing the loft thickness of various specimens as a function of different types of heat and different temperatures, in accordance with certain examples.

The boards were tested for a change in thickness under various heating conditions. The H1100 and EG-HV containing boards were air heated at 204 deg. Celsius (left bar in FIG. 11) and was air heated at 225 deg. Celsius (right column in FIG. 11). Each of the EG-249C boards was air heated at the same temperatures and was also subjected to infrared heating (IR) at 200 deg. Celsius and at 220 deg. Celsius (from left to right the bars in FIG. 11 for EG-249C represents air heating at 204 deg. Celsius, air heating at 225 deg. Celsius, IR heating at 200 deg. Celsius and IR heating at 220 deg. Celsius; the bars in EG-HV represent air heating at 204 deg. Celsius and at 225 deg. Celsius).

The microsphere board thickness increased at both temperatures with thickness at the lower temperature being close to the thickness at the higher temperature. Compared to the microspheres, the EG-249C boards were generally insensitive to air heating showing no or little change in thickness. The EG-HV board thickness increased upon air heating. EG-HV is a lower grade expandable graphite material and expands at a lower temperature than EG-249C. The thickness of all of the EG-249C boards increased dramatically using IR heating at 220 deg. Celsius. In addition, the thickness of the boards varied with expandable graphite materials loading amounts and with the IR heating temperature. The results are consistent with the use of expandable graphite materials to selectively increase board thickness by selecting desired lofting temperatures.

Example 2

A series of boards were prepared using the process described in Example 1. The boards each included polypropylene and glass fibers in similar amounts as noted in Example 1. Three different boards were prepared: one including H1100 microspheres, one including N351 expandable graphite materials, and one including N400 expandable graphite materials. Each of the boards was tested for Stage 1 loft by convection heating at 200 deg. Celsius. The results are shown in Table 1. Round pucks of 99 mm in diameter were used as the test specimens. The thickness was measured at three different areas using calipers.

TABLE 1

| | Convection Heating time at 200 deg. Celsius (min.) | Thickness (mm) |
|---|---|---|
| H1100 | 1 | 5.526 |
| | 2 | 8.596 |
| | 3 | 7.408 |
| | 4 | 7.725 |
| N351 | 1 | 2.527 |
| | 2 | 5.977 |
| | 3 | 6.860 |
| | 4 | 7.477 |
| N400 | 1 | 2.533 |
| | 2 | 3.463 |
| | 3 | 4.550 |
| | 4 | 5.010 |

The results were consistent with the thickness of each board increasing over time with continuous heating. There is noticeable collapse in the microsphere board (H1100) with increased heating as the thickness decreased from minute 2 to minute 4. No collapse of the expandable graphite materials boards was observed.

Example 3

In order to determine the reserve lofting capacity (how much additional thickness could be achieved) of the three boards of Example 2, each of the boards was cooled at room temperature for one day. The boards were then subjected to stage 2 loft by convection heating at 200 deg. Celsius for 3 minutes (for the H1100 board) and by IR heating at about 220 deg. Celsius for 1.5 minutes (for the EG board). Microsphere boards (H1100) were subjected to the different heating conditions to permit maximum loft without causing the microspheres to burst. The results are listed in Table 2.

TABLE 2

|  | Convection Heating time at 200 deg. Celsius (min.) | Heating Conditions | Stage 1 Thickness (mm) | Stage 2 Full Thickness (mm) | Loft Triggered at Stage 1 (%) | Reserved Loft Capacity (%) |
|---|---|---|---|---|---|---|
| H1100 | 1 | Convection | 5.526 | 8.892 | 62.1 | 37.9 |
|  | 2 | Heating | 8.596 | 10.176 | 84.5 | 15.5 |
|  | 3 | 200 deg. C. | 7.408 | 9.707 | 76.3 | 23.7 |
|  | 4 | For 3 min. | 7.725 | 7.714 | 100.1 | −0.1 |
| N351 | 1 | IR Oven at | 2.527 | 9.543 | 26.5 | 73.5 |
|  | 2 | 220 deg. C. | 5.977 | 10.267 | 58.2 | 41.8 |
|  | 3 | for 1.5 min. | 6.860 | 9.830 | 69.8 | 30.2 |
|  | 4 |  | 7.477 | 9.320 | 80.2 | 19.8 |
| N400 | 1 |  | 2.533 | 7.180 | 35.6 | 64.4 |
|  | 2 |  | 3.463 | 7.583 | 45.7 | 54.3 |
|  | 3 |  | 4.550 | 6.083 | 74.8 | 25.2 |
|  | 4 |  | 5.010 | 6.223 | 80.5 | 19.5 |

The loft triggered at Stage 1 represents the loss of potential lofting capacity. For example, for the H1100 board with a full thickness of 8.892 mm, the loft triggered at stage 1 was 5.526 mm. The full thickness of the board was 8.892 after stage 2 loft, which means the board was lofted after stage 1 to 5.526/8.892=62.1% of its total lofting capacity. This result means that only 37.9% reserve lofting capacity remained for that board.

In contrast, the expandable graphite material boards at a similar time retained 73.5% reserve lofting capacity for N351 and 64.4% reserve lofting capacity for N400. These results are consistent with the expandable graphite materials providing additional reserve lofting capacity as compared to microspheres.

Example 4

Additional tests were performed using the boards of Example 2. These tests included measurement of basis weight of each board during heating as well as ash content and determining of a loft index after lofting the boards at a temperature of 200 deg. Celsius using convection heating in an oven. 99 mm diameter pucks were used as the test samples with 10 pucks used for each experiment. For all data, the thickness values are based on the average measurement for all 10 pucks. The basis weight, coefficient of variation (COV), thicknesses, loft ratio (lofted thickness divided by as-is thickness), ash content (determined by placing a sample an 800 deg. Celsius oven to burn it—only glass fiber remains and what remains is the weight percent of glass fibers), loft index-1 (loft ratio divided by ash content), lofting agent content (shown in Table 3 of FIG. 12 as MS content) and loft-index 2 (loft index-1divided by lofting agent content) were determined. The use of a loft-index can eliminate (or normalize) variations in the total gsm of each board leading to directly comparable results. Microsphere content (H1100) was determined by measuring the weight before and after the microspheres burst to calculate the content of microspheres in the sample. The 7% content for the EG (N351 and N400) was based on adding that amount of EG to the test samples. The results are shown in Table 3 of FIG. 12

The lofting index of all EG sample (N351 and N400) were at least 50% less than corresponding microsphere samples at the same heating times. These values are consistent with the EG containing boards providing enhanced reserve lofting capacity after convection heating at 200 deg. Celsius.

Example 5

Additional tests were performed using the boards of Example 2. These tests included measurement of basis weight of each board during heating as well as ash content and determining of a loft index after lofting the boards at a temperature of 220 deg. Celsius using convection heating in an oven. The results were obtained/determined as described in connection with Example 4. The results are shown in Table 4 of FIG. 13.

The lofting index of all EG sample (N351 and N400) were less than corresponding microsphere samples at the same heating times. The loft index at each heating time for each sample was generally greater than the corresponding loft index obtained at 200 deg. Celsius. These values are consistent with the EG providing enhanced control of lofting by varying processing temperatures.

Example 6

Different types of expandable graphite materials were tested by producing boards similar to the boards of Example 2. The weight percentage of each expandable graphite materials in the board was 8 weight percent. The H1100 microsphere control board included 24 weight percent microspheres. The basis weight of each board was about 800 gsm. The loft was measured under various conditions listed in Table 5. TMA refers to the onset temperature determined by using a thermomechanical analyzer to measure actual temperature onset of loft begins. The NYACOL value is the corresponding value provided by the supplier.

TABLE 5

| Expandable Graphite Grade | % Particle Size (>300 microns) | Expansion Volume (cm3/g) | Onset Temperature (deg. Celsius) NYACOL | TMA | Selectivity to different heating sources: Loft Compared to H1100 based on one-min heating | | | |
|---|---|---|---|---|---|---|---|---|
| | | | | | Convection Heating | | IR Heating | |
| | | | | | 200 | 220 | 200 | 220 |
| HV | 80-91% | >250 | 180 ± 10 | 173 | Mid | Mid | Mid | Low |
| 249C | 79-91% | >250 | 170 ± 10 | 198 | Low | Low | Low | Mid |
| 351 | 100% | 330-350 | 165-185 | 176 | Low | Low | Low | High |
| KP251 | 72-91% | >250 | 135-155 | 145 | High | High | High | High |
| 400 | 79-91% | >400 | 170 ± 10 | — | Low | Low | Low | Mid |

Figure 14:
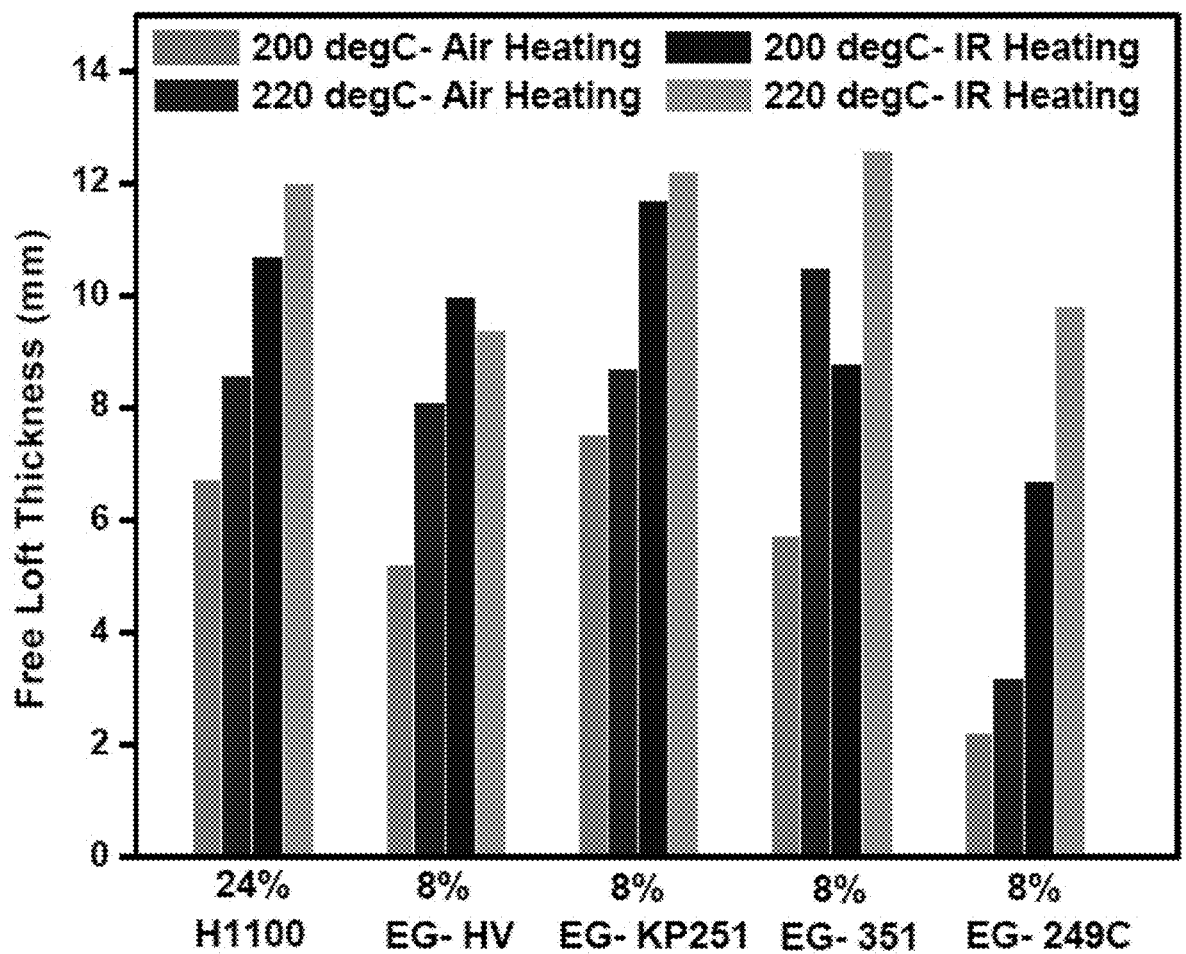
FIG. 14 is a bar graph showing lofting test results, in accordance with certain examples.

The results in Table 5 are consistent with the expandable graphite materials providing high reserve lofting capacity after convection heating at 200 deg. Celsius for 1 minute. For the HV, 351 and KP251 EG materials, the ability to achieve high loft at 220 deg. Celsius for one minute provides for reserve loft capacity in boards including these materials. A bar graph comparing loft thickness at the various conditions is shown in FIG. 14. From left to right in each bar grouping represents air heating at 200 deg. Celsius, air heating at 220 deg. Celsius, IR heating at 200 deg. Celsius and IR heating at 220 deg. Celsius. As shown in the graph, the EG samples are sensitive to the type of heat applied. This selectivity permits better control of lofting by selection of suitable heat application processes. In contrast, microsphere loft is generally insensitive to the type of heat applied. In certain instances, it is desirable to select the EG material based on having a large gap between the loft at 200 deg. Celsius and the loft at 220 deg. Celsius. This large gap provides for more reserve loft capacity. In addition, by selecting a large gap and by using EG material that does not provide substantial loft under convection conditions, infrared heating (or other heating) can be applied to better control the final thickness of the article.

Example 7

The ability of expandable graphite materials (in the absence of a flame retardant agent) to provide flame retardancy to thermoplastic composite articles was tested. A control board comprising the H1100 microspheres and test boards comprising various expandable graphite materials were tested. The results are shown in Table 6 in FIG. 15. The parentheses represent the expandable graphite materials loading by weight percent in each board. Each board included a basis weight of about 800 gsm and was molded to a thickness of about 2 mm. Burning rate was measured in inches per minute as indicated in the FMVSS 302 test dated 1991 as described herein. Burning distance was measured in inches as indicated in the FMVSS-302 test method.

The results are consistent with self-extinguishing performance in expandable graphite materials boards being unaffected before and after lofting. At 5% EG-249C loading, the boards were self-extinguishing, indicating that flame retardancy can be provided with as little as 5% by weight expandable graphite materials. In comparison, microsphere boards were not self-extinguishing. The timing mark in Table 6 refers to a mark about 4 inches inward and from the end of the flame applied to the board.

Example 8

An additional set of boards were tested for flame retardancy. The materials used and their loading weight are shown in Table 7 in FIG. 16. All of the expandable graphite materials boards were self-extinguishing when the boards were molded to 2 mm. As the porosity of the board increases, it generally becomes more difficult to pass the self-extinguishing test. Even when the expandable graphite materials boards were lofted and molded to an overall thickness of 8 mm, which means there is more air or a higher porosity present, all of the expandable graphite materials boards were self-extinguishing.

Example 9

Several boards were tested for their non-oil and oil flammability. The boards had a basis weight of about 1310 gsm. The boards each included a Superlite™ core (mixture of polypropylene and about 55 weight percent glass fibers) in combination with about 10 weight percent Asbury 3335 expandable graphite material. There was no drop in tensile strength in the machine direction or the cross direction after the boards were aged. Aging included exposing the boards to heat and water at different times and humidity values including 48 hours at 38+/−2 deg. Celsius, and 95+/−2 percent relative humidity. A long heat cycle of 7 days at 150 deg. Celsius was also used to age the boards. The boards were then immersed in distilled water for 48 hours at room temperature.

The boards were also tested for their ability to be self-extinguishing in the presence of oil or no oil. The SAE J369 test dated 2013 (equivalent to the FMVSS 302 test described herein) was used to test flammability. The testing results are shown in Table 8 listed in FIG. 17. All boards passed (noted as SE/0 in Table 8) the oil flammability test. At a process temperature of 200 deg. Celsius, there was 8.10 mm of free loft. At a process temperature of 220 deg. Celsius, there was 12.46 mm of free loft (less reserved lofting capacity than the 200 deg. Celsius board). At a process temperature of 240 deg. Celsius, there was 22.97 mm of free loft (less reserved lofting capacity than the 220 deg. Celsius board). Five replicates of each board were tested. As noted in more detail above, "B" in Table 8 refers to boards which were observed to burn. The cells listing "B" were boards where the flame travels on the surface rather than into the core. Traveling into the core is desirable as the expandable graphite within the core should assist, at least in part, in extinguishing the flame.

Another board was produced using the same core material (but with 45 weight percent glass) including about 10 weight percent Asbury 3335 expandable graphite material and 2 weight percent DJ Semichem. microsphere lofting agent. When molded to 8 mm thickness, this board exhibited a SE/0 performance (passed the SAE J369 test) in oil self-extinguishing tests. These results were consistent with the expandable graphite material providing a board that passes flammability tests and still has reserved lofting capacity to permit further processing, e.g., molding, into a desired part or shape.

Example 10

Several additional boards were produced including similar amounts of expandable graphite materials but different loft thicknesses. The boards produced included a Superlite™ core in combination with the EG materials. The board listing is shown in Table 9.

TABLE 9

| Run | EG % | Core Basis weight (gsm) | Free loft (mm) |
|---|---|---|---|
| Run 1 | 5% | 1000 | 6.88 |
|  | 5% | 750 | 6.06 |
| Run 2 | 5% | 1000 | 8.25 |
|  | 5% | 750 | 8.35 |
| Run 3 | 5% | 1100 | 9.49 |
|  | 5% | 700 | 9.76 |

The boards that were lofted to 6-7 mm (Run 1) could be processed in a similar manner as the Superlite™ core without any EG, e.g., can be molded at similar temperatures as the Superlite™ core without any EG. For Runs 1 and 2, on one side of the core was a 90 gsm HOF scrim and on the other side of the core was a 225 gsm polypropylene film. For Run 3, on one side of the core was a 20 gsm polyethylene terephthalate (PET) scrim and on the other side of the board was a 98 gsm polypropylene film. Some wrinkling was observed for the boards lofted between 8-9 mm (Run 2). The boards lofted over 9 mm free loft could be processed in a similar manner as the Superlite™ core and had a reduced cycle time compared to the Superlite™ core by itself.

Example 11

A board can be prepared with a core weight of about 1200 gsm and include glass fibers (40-60 weight percent), 5-15 weight percent expandable graphite materials, optionally 0-5 weight percent microsphere lofting agent with the balance being thermoplastic material such as a polyolefin, e.g., polypropylene. If desired, a skin material such as a scrim, for example, can be deposited on one or more sides of the core material. In some instances, a flame retardant scrim can be placed on one surface, and a non-flame retardant scrim can be placed on an opposite surface. The exact basis weights of the scrim can vary from about 20 gsm to about 100 gsm. In other instances, one side of the core may comprise a film such as a polyolefin film.

Example 12

Figure 18:
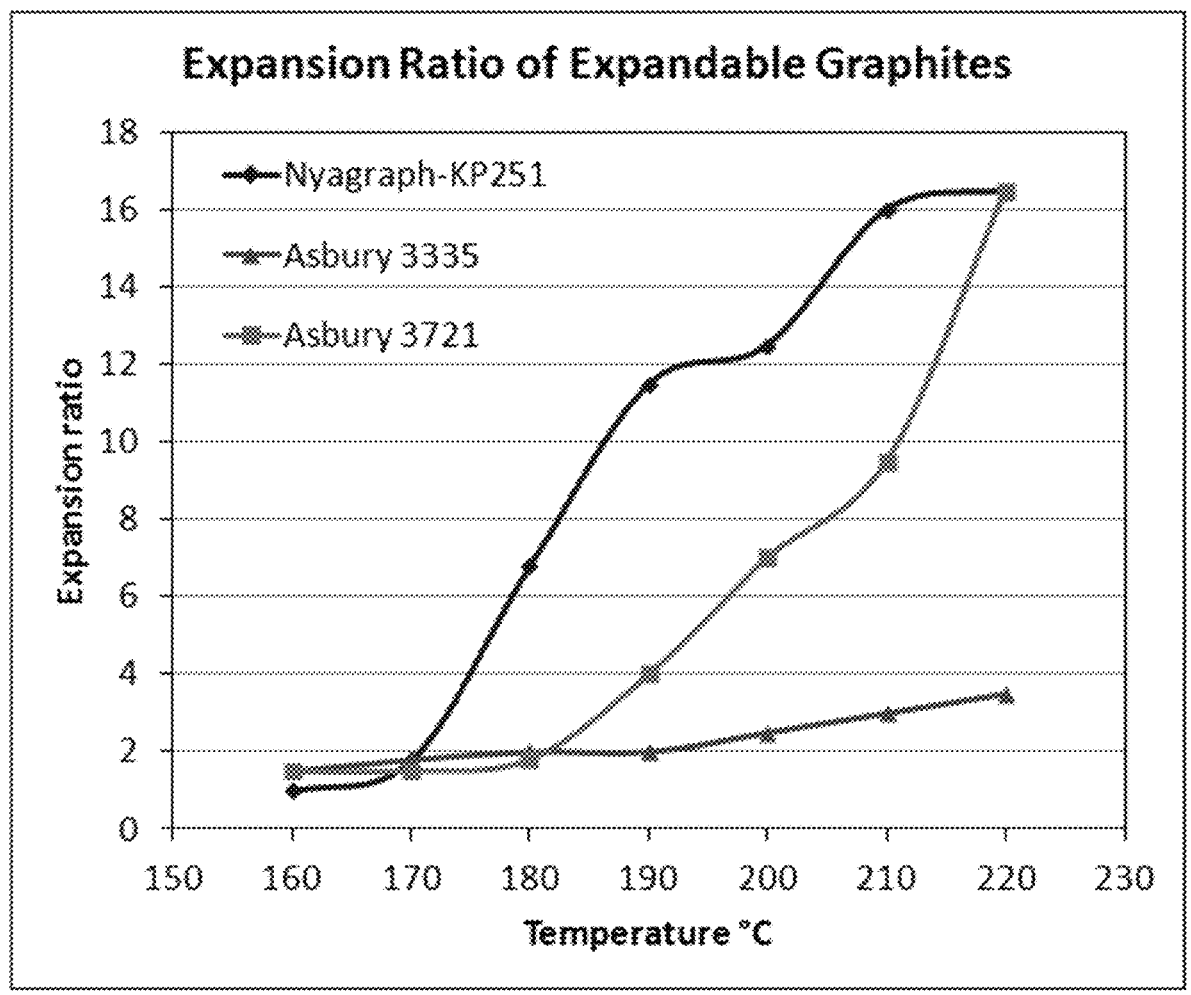
FIG. 18 is a graph showing expansion ratio as a function of temperature for three different expandable graphite materials, in accordance with certain examples.

The expansion rate of three different expandable graphite materials as a function of increasing temperature was tested. The results are shown in FIG. 18. In comparing the different EG materials, the 3335 material had a lower expansion ratio in the temperature range between 160 deg. Celsius and 220 deg. Celsius. These results are consistent with selecting an expandable graphite material to have a suitable loft temperature for a particular processing temperature. For example, where lofting is desired above 170 deg. Celsius, the Nyagraph KP251 can be used. Where lofting is desired above 180 deg. Celsius, either the Nyagraph KP251 or the Asbury 3721 (or both) can be used.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. An automotive thermoplastic composite article comprising:
a porous core layer comprising a web of open celled structures comprising random crossing over of a plurality of reinforcing fibers held together by a thermoplastic material, wherein the porous core layer comprises a porosity of 20% to 95%, and wherein the porous core layer further comprises non-covalently bonded expandable graphite particles homogeneously dispersed in the web of open celled structures of the porous core layer, wherein the automotive thermoplastic composite article meets the Federal Motor Vehicle Safety Standard 302 (FMVSS 302) flammability test dated 1991 and self-extinguishes, wherein the expandable graphite material lofts, under infrared heating conditions, at a loft temperature that is 20 degrees Celsius or higher than a melting point temperature of the thermoplastic material in the porous core layer, in which the porous core layer provides flame retardancy and is halogen free, and wherein the porous core layer further comprises covalently bound expandable graphite particles in the web of open celled structures of the porous core layer; and
a skin disposed on a first surface of the porous core layer.

2. The automotive thermoplastic composite article of claim 1, in which the non-covalently bonded and covalently bound expandable graphite particles are effective to increase the thickness of the porous core layer by at least 50% after radiant heating above a loft onset temperature of the expandable graphite materials.

3. The automotive thermoplastic composite article of claim 1, in which the non-covalently bonded and covalently bound expandable graphite particles are selected to be substantially insensitive to loft upon convection heating.

4. The automotive thermoplastic composite article of claim 1, in which the thermoplastic material comprises at least one of a polyethylene, a polypropylene and mixtures thereof.

5. The automotive thermoplastic composite article of claim 3, in which the polyolefin thermoplastic material comprises particles and the average particle size of the particles of the polyolefin thermoplastic material is similar to the average particle size of the non-covalently bonded expandable graphite particles.

6. The automotive thermoplastic composite article of claim 1, in which the porous core layer provides flame retardancy and is halogen free.

7. The automotive thermoplastic composite article of claim 6, further comprising a flame retardant agent in the porous core layer, in which the flame retardant agent comprises at least one of N, P, As, Sb, Bi, S, Se, or Te.

8. The automotive thermoplastic composite article of claim 1, in which the porous core layer provides flame retardancy and does not include a flame retardant agent.

9. The automotive thermoplastic composite article of claim 1, further comprising a lofting agent in the porous core layer.

10. The automotive thermoplastic composite article of claim 1, further comprising a skin disposed on the first surface of the porous core layer.

11. The automotive thermoplastic composite article of claim 10, in which the non-covalently bonded and covalently bound expandable graphite particles are effective to increase the thickness of the porous core layer by at least 50% after radiant heating above a loft onset temperature of the expandable graphite materials.

12. The automotive thermoplastic composite article of claim 10, in which the non-covalently bonded and covalently bound expandable graphite particles are selected to be substantially insensitive to loft upon convection heating.

13. The automotive thermoplastic composite article of claim 10, in which the thermoplastic material comprises at least one of a polyethylene, a polypropylene and mixtures thereof.

14. The automotive thermoplastic composite article of claim 12, in which the polyolefin thermoplastic material comprises particles and an average particle size of the non-covalently bonded expandable graphite particles is at least 50% of an average particle size of the olefin polyolefin thermoplastic material particles.

15. The automotive thermoplastic composite article of claim 1, further comprising a flame retardant agent in the porous core layer, in which the flame retardant agent comprises at least one of N, P, As, Sb, Bi, S, Se, or Te.

16. The automotive thermoplastic composite article of claim 12, in which the porous core layer provides flame retardancy and does not include a flame retardant agent, wherein the thermoplastic composite article comprises a second skin disposed on the second surface of the porous core layer, wherein the porous core layer comprises polypropylene and glass fibers, wherein the polypropylene is present from 20 weight percent to 80 weight percent, wherein the non-covalently bonded expandable graphite material comprises an average particle size of at least 300 microns, and wherein the skin is a scrim.

17. The automotive thermoplastic composite article of claim 10, in which the skin comprises expandable graphite materials.

* * * * *